United States Patent
Ikeda et al.

(10) Patent No.: US 8,050,825 B2
(45) Date of Patent: Nov. 1, 2011

(54) ELECTRIC POWER-STEERING CONTROL APPARATUS

(75) Inventors: Hidetoshi Ikeda, Tokyo (JP); Masaya Endo, Tokyo (JP); Isao Kezobo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 385 days.

(21) Appl. No.: 12/434,768

(22) Filed: May 4, 2009

(65) Prior Publication Data

US 2010/0004824 A1   Jan. 7, 2010

(30) Foreign Application Priority Data

Jul. 3, 2008  (JP) .................. 2008-174703

(51) Int. Cl.
*B62D 5/04* (2006.01)
(52) U.S. Cl. .......................... 701/42; 180/446
(58) Field of Classification Search .................. 701/41, 701/42, 43; 180/443, 446
See application file for complete search history.

(56) References Cited

U.S. PATENT DOCUMENTS

| | | | |
|---|---|---|---|
| 5,473,231 A | 12/1995 | McLaughlin et al. | |
| 5,504,403 A | 4/1996 | McLaughlin | |
| 7,742,858 B2 * | 6/2010 | Tamaizumi | 701/41 |
| 7,826,950 B2 * | 11/2010 | Tamaizumi et al. | 701/42 |
| 7,860,624 B2 * | 12/2010 | Kubota et al. | 701/41 |
| 2004/0162655 A1 * | 8/2004 | Patankar | 701/41 |
| 2007/0118262 A1 * | 5/2007 | Nishizaki et al. | 701/41 |

FOREIGN PATENT DOCUMENTS

| | | |
|---|---|---|
| JP | 7-309247 | 11/1995 |
| JP | 7-309250 | 11/1995 |

OTHER PUBLICATIONS

U.S. Appl. No. 12/811,281, filed Jun. 30, 2010, Endo, et al.

* cited by examiner

*Primary Examiner* — Kevin Hurley
(74) *Attorney, Agent, or Firm* — Oblon, Spivak, McClelland, Maier & Neustadt, L.L.P.

(57) ABSTRACT

A steering-torque detecting unit detects a steering torque applied by a driver as a steering torque signal. A phase-lag compensation unit performs an operation having a frequency response characteristic of multiplying a phase-lag compensation by a constant for the steering torque signal based on a signal obtained by applying an amplification by a first gain and a low pass filter on the steering torque signal and a signal obtained by applying an amplification by a second gain on the steering torque signal. A current control unit controls a current applied to a motor to follow a current command that is obtained based on an output of the phase-lag compensation unit.

8 Claims, 10 Drawing Sheets

ELECTRIC POWER-STEERING CONTROL APPARATUS

BACKGROUND OF THE INVENTION

1. Field of the Invention

The present invention relates to an electric power-steering control apparatus that assists a steering force by means of a driving force from a motor.

2. Description of the Related Art

Generally, an electric power-steering control apparatus detects a steering torque generated when a driver rotates a steering wheel and calculates a current command for a motor that is connected to a steering column that links wheels with the steering wheel via a steering gear in a compensation calculation unit based on the detected steering torque. Then, a motor torque is generated to assist a steering operation by the driver by controlling a motor current to follow the current command.

In the compensation calculation unit, the current command is calculated by using gains, various filters, and the like for not impairing the stability and the road feel of a vehicle. To achieve such a purpose, also a calculation to change properties of the gain and the filter depending on a speed of the vehicle (vehicle speed) and a measured amplitude of the torque is generally performed. In most cases, it is necessary to optimize properties of the electric power-steering control apparatus according to the type of a vehicle to which the electric power-steering control apparatus is applied, and performing the optimization simply and systematically is an important issue. Furthermore, to realize the optimization using a low-cost calculation device, having the calculation as simple as possible is another important issue.

According to an electric power-steering control apparatus described in Japanese Patent Application Laid-open No. H7-309250, a signal is generated using a function called an assist curve, which is nonlinear for the magnitude of the steering torque and changes its characteristic depending on a vehicle speed. Then, the calculation of the current command is performed by applying a lag-lead type filter called an adaptive torque filter on a calculation result of the assist curve.

The assist curve is for realizing the road feel according to the magnitude of the steering torque and the vehicle speed, and because it has nonlinear characteristics as described above, a fluctuation occurs in a linearized gain that is a ratio of differential changes of an input and an output. Such an adaptive torque filter is designed in such a manner that a desired characteristic is obtained when the linearized gain of the assist curve is maximized; however, if the characteristic of the adaptive torque filter is fixed, the gain-crossover frequency (a frequency at which a gain of an open-loop frequency response crosses with 0 dB) that greatly affects the stability of a control system fluctuates, and the characteristic of the control system is deviated from a desired operation.

To cope with the problem, in a technology described in Japanese Patent Application Laid-open No. H7-309250, the linearized gain that is the ratio of the differential changes of the input and the output is successively calculated and a pole of the adaptive torque filter is successively calculated according to a result of calculating the linearized gain, so that the total gain of the compensation calculation unit does not change in the gain-crossover frequency. For this reason, due to the successive calculations of the linearized gain and the pole of the adaptive torque filter, there is a problem that the calculation amount is increased. Furthermore, because the assist curve described above is set for determining a steady-state characteristic of the compensation calculation unit, which the gain in the low frequency range, the characteristic of the adaptive torque filter is changed in the high frequency range, so that the crossover frequency that is the characteristic of the high frequency range is not changed with a change of the linearized gain of the assist curve. Therefore, a design for the low frequency range and a design for the high frequency range greatly interfere with each other. As a result, it is hard to figure out a correspondence between configurations of constituent units that configure the compensation calculation unit, such as the adaptive torque filter and the assist curve, and the designs for the frequency ranges described above, and the design is neither systematic nor simple.

In the electric power-steering control apparatus described in Japanese Patent Application Laid-open No. H7-309247, another countermeasure technique is described for a similar problem as the case in Japanese Patent Application Laid-open No. H7-309250. In this technology, for the detected steering torque, the signal is separated into a low frequency component and a high frequency component using a blending filter that is a combination of a low pass filter and a high pass filter. For the low frequency component of the torque detection value, a nonlinear calculation as in the assist curve described in Japanese Patent Application Laid-open No. H7-309250 is performed, and for the high frequency component of the torque detection value, a stationary linear gain is multiplied; and by inputting a sum of the calculation values to the adaptive torque filter, the output of the adaptive torque filter is calculated as the current command.

The adaptive torque filter described in Japanese Patent Application Laid-open No. H7-309247 is designed as a lag-lead filter such that the steering control apparatus shows a desired characteristic when the linearized gain is maximized as in the technology described in Japanese Patent Application Laid-open No. H7-309250. In other words, the gain in the low frequency range is designed to be relatively larger than the gain in the high frequency range. While the adaptive torque filter is changed according to the change of the linearized gain in the assist curve in Japanese Patent Application Laid-open No. H7-309250, in Japanese Patent Application Laid-open No. H7-309247, a desired characteristic, such that the gain-crossover frequency does not fluctuate with the change of the linearized gain, is realized by adding an appropriately designed blending filter with the characteristic of the adaptive torque filter fixed with respect to the change of the linearized gain. More specifically, the blending filter added to the adaptive torque filter is mainly designed to have a phase lead characteristic to decrease the gain in the low frequency range. As a result, the gain in the low frequency range, which greatly affects the road feel, is determined by the product of the adaptive torque filter and the blending filter, once amplified relatively largely by the adaptive torque filter and then decreased by the blending filter. For this reason, the design becomes complicated calculation amount is increased.

As described above, according to the electric power-steering control apparatus described in Japanese Patent Application Laid-open No. H7-309250, because the pole of the adaptive torque filter is successively calculated by successively calculating the linearized gain of the changing assist curve in the compensation calculation unit, there is a problem that the calculation amount is increased. Furthermore, it is hard to figure out the correspondence between the operation of each unit configuring the compensation calculation unit and the design that differs depending on the frequency range, and the design is neither systematic nor simple.

Furthermore, according to the electric power-steering control apparatus described in Japanese Patent Application Laid-open No. H7-309247, an adaptive torque filter, which is a lag-lead filter designed to be optimal in a specific condition of the linearized gain of the changing assist curve is provided, and an appropriately designed blending filter is further added such that the steering control apparatus has a desired characteristic according to the assist curve. For this reason, an order of the steering control apparatus is increased due to the addition of the blending filter, and the design becomes complicated accordingly.

In short, in the technologies described in the above literatures, there are problems that the calculation amount in the steering control apparatus is increased and that the design is neither systematic nor simple.

SUMMARY OF THE INVENTION

It is an object of the present invention to at least partially solve the problems in the conventional technology.

According to one aspect of the present invention, there is provided an electric power-steering control apparatus that assists in steering wheels of a vehicle in response to a steering torque applied by a driver by using a driving force of a motor. The electric power-steering control apparatus includes a steering-torque detecting unit that detects the steering torque as a steering torque signal; a phase-lag compensation unit that performs an operation having a frequency response characteristic of multiplying a phase-lag compensation by a constant for the steering torque signal based on a first signal obtained by applying an amplification by a first gain and a low pass filter on the steering torque signal and a second signal obtained by applying an amplification by at least a second gain on the steering torque signal; and a current control unit that controls a current applied to the motor to follow a current command that is obtained based on an output of the phase-lag compensation unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an electric power-steering control apparatus according to the present invention will be explained below in detail with reference to the accompanying drawings. It is understood that the present invention is not limited to the specific embodiments described below.

Figure 1:
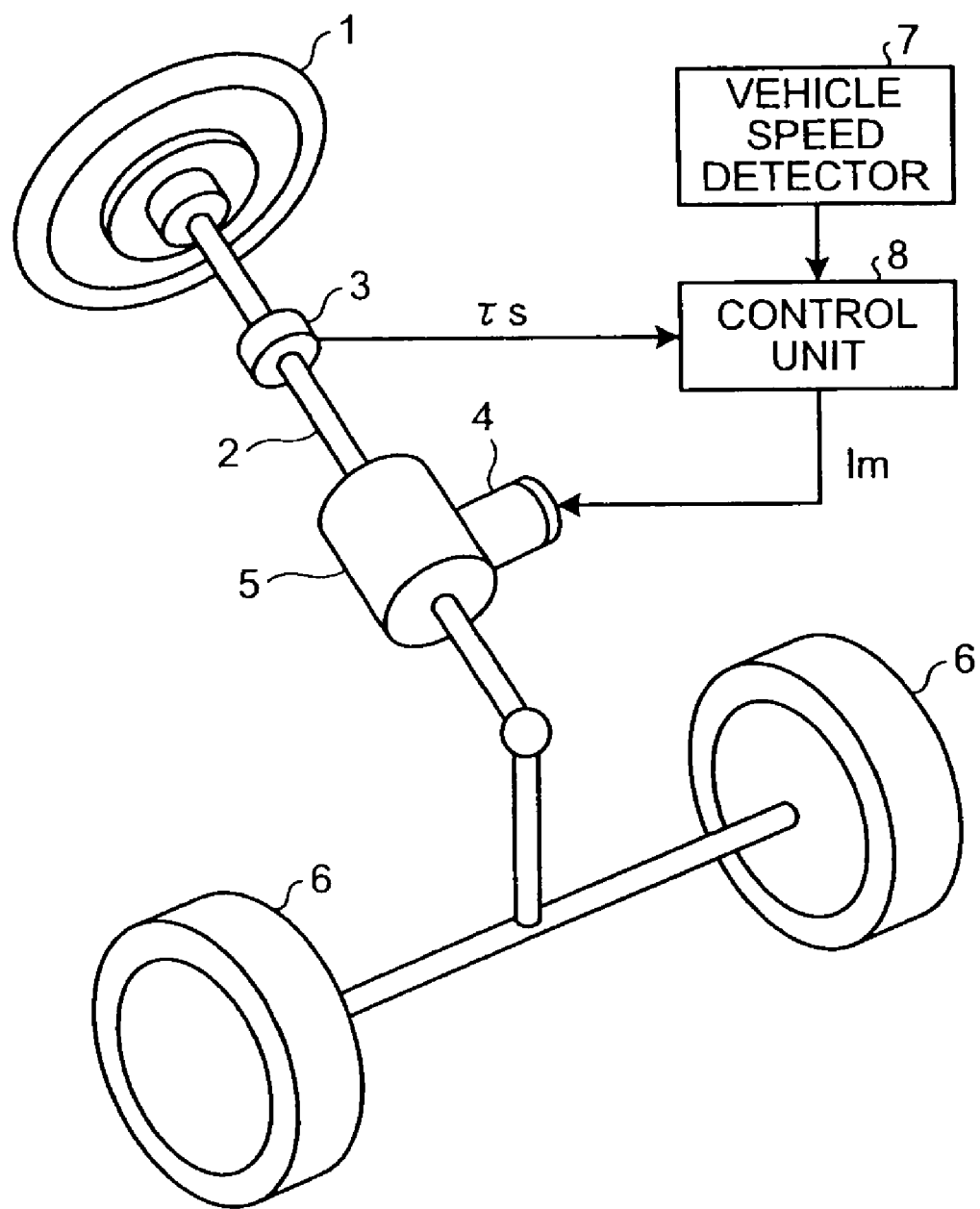
FIG. 1 is a schematic diagram of an electric power-steering control apparatus according to a first embodiment of the present invention.

FIG. 1 is a schematic diagram of an electric power-steering control apparatus according to a first embodiment of the present invention. In the configuration shown in FIG. 1, wheels 6 are steered according to a rotation of a steering column 2 to which a steering wheel 1 is linked. A steering torque detector 3 is arranged on the steering column 2, and a steering torque acting on the steering column 2 is detected as a steering torque signal $\tau s$ by the steering torque detector 3. A motor 4 is linked to the steering column 2 via a decelerating mechanism 5, thereby enabling to give a motor torque $\tau m$ generated by the motor to the steering column 2. The vehicle speed is detected by a vehicle speed detector 7. A control unit 8 supplies a current to the motor 4 based on the steering torque signal $\tau s$ detected by the steering torque detector 3 and a vehicle speed detected by the vehicle speed detector 7.

Figure 2:
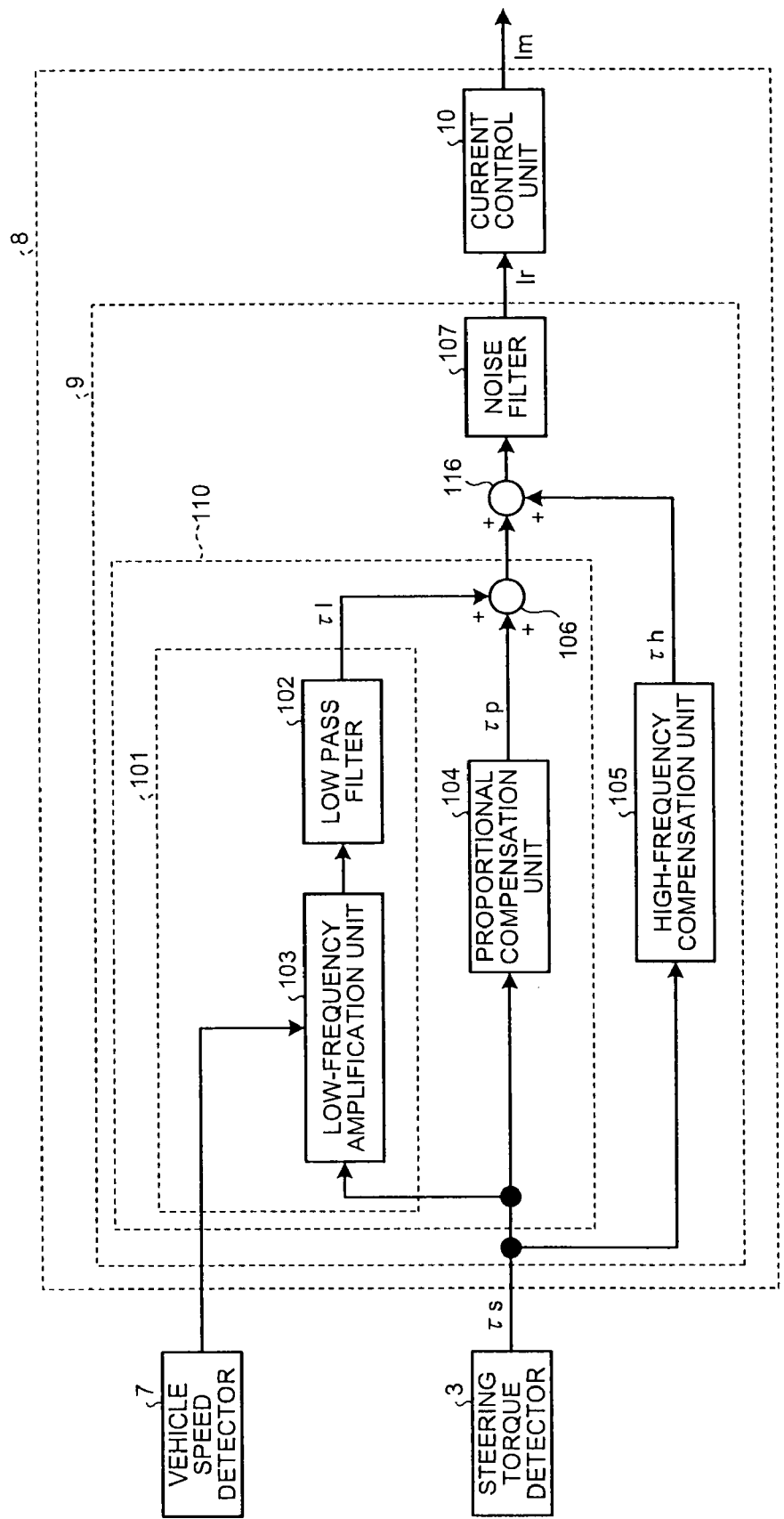
FIG. 2 is a block diagram of a control unit in the electric power-steering control apparatus according to the first embodiment.

FIG. 2 is a block diagram of the control unit 8. The control unit 8 includes a compensation calculation unit 9 and a current control unit 10, and inputs the steering torque signal $\tau s$ detected by the steering torque detector 3 and the vehicle speed detected by the vehicle speed detector 7 to the compensation calculation unit 9. The compensation calculation unit 9 performs a predetermined calculation and outputs a current command Ir as a result of the calculation. The current control unit 10 controls the current Im of the motor 4 such that it follows the current command Ir calculated in the compensation calculation unit 9. In addition, although the steering torque signal $\tau s$ to be actually input to the compensation calculation unit 9 is sometimes a signal when the steering torque detector 3 detects a physical steering torque or a signal when a correction is applied to the detected signal, in what follows, the input to the compensation calculation unit 9 is simply described as the steering torque $\tau s$.

The compensation calculation unit 9 inputs the steering torque $\tau s$ in a phase-lag compensation unit 110, and outputs a signal having frequency response characteristics for multiplying the phase-lag compensation by a constant for the steering torque $\tau s$ using the calculation described below.

In the phase-lag compensation unit 110, the steering torque $\tau s$ is input to a low-frequency compensation unit 101. The low-frequency compensation unit 101 includes a low-frequency amplification unit 103 and a low pass filter 102, and inputs the steering torque $\tau s$ in the low-frequency amplification unit 103.

The low-frequency amplification unit 103 outputs a signal amplified using a function called the assist curve that is generally determined by reading a lookup table or the like. This assist curve is for appropriately setting the road feel of the driver, and determines the output according to the steering torque $\tau s$ and the vehicle speed. Because, generally the variation of the vehicle speed is slower compared with the variation of the steering torque τs, when restating the operation of the low-frequency amplification unit 103 using the assist curve, it is said that an amplification for multiplying a nonlinear gain for the steering torque τs is performed, and in addition, this nonlinear gain is changed according to the vehicle speed.

The low pass filter 102 outputs the result that a low pass filter calculation is performed for the output of the low-frequency amplification unit 103 as a low-frequency compensation torque τl. The frequency response characteristics of the low pass filter 102 become flat that the gain is substantially 1 at a frequency lower than a low pass filter frequency ωl [rad/s], which is a predetermined frequency, and the gain decreases in the high frequency range higher than the low pass filter frequency ωl.

In the low-frequency amplification unit 103 determined by the assist curve as described above, the ratio of tiny variations of the output of the low-frequency amplification unit 103 to the input thereof, that is, the tiny variations of the steering torque τs is described as the linearized gain Kl1. A transfer function Gl(s) of the low-frequency compensation unit 101 has characteristics for multiplying the gain Kl1 by the low pass filter as shown in the following equation.

$$Gl(s) = Kl1 \cdot \omega l/(s+\omega l) \tag{1}$$

Next, the phase-lag compensation unit 110 inputs the steering torque τs in a proportional compensation unit 104, which performs a calculation to multiply a proportional gain Kp1 that is a predetermined numerical value, and outputs the result as a proportional compensation torque τp. A transfer function Gp(s) of the proportional compensation unit 104 is expressed by the following equation.

$$Gp(s) = Kp1 \tag{2}$$

Next, the phase-lag compensation unit 110 outputs the result of adding the low-frequency compensation torque τl and the proportional compensation torque τp using an adder 106. From Equations (1) and (2) described above, a transfer function Lg1(s) of the phase-lag compensation unit 110 by making the steering torque τs as an input becomes the following equation.

$$Lg1(s) = \{Kp1 \cdot s + (Kl1+Kp1) \cdot \omega l\}/(s+\omega l) \tag{3}$$

The linearized gain Kl1 in the low-frequency amplification unit 103 and the proportional gain Kp1 in the proportional compensation unit 104 are selected here to be positive values. With this, a high-pass gain of the phase-lag compensation unit 110 becomes Kp1, and a low-pass gain of the phase-lag compensation unit 110 becomes a sum of Kl1 and Kp1, resulting in characteristics that the low-pass gain is larger than the high-pass gain. That is, the phase-lag compensation unit 110 performs a calculation having characteristics for multiplying the phase-lag compensation by a constant.

Next, the compensation calculation unit 9 inputs the steering torque τs in a high-frequency compensation unit 105, performs a calculation of multiplying a differentiation or a pseudo differential calculation by a differential gain Kd1, which is a predetermined value, and outputs as a high-frequency compensation torque τh. To make the explanation clear, if a pure differentiation is used in the calculation described above, a transfer function Gh(s) of the high-frequency compensation unit 105 becomes the following equation.

$$Gh(s) = Kd1 \cdot s \tag{4}$$

Next, the adder 106 inputs a result of adding the output of the phase-lag compensation unit 110 and the high-frequency compensation torque τh in a noise filter 107.

The noise filter 107 performs a low pass filter calculation expressed by the following equation Fn(s) so as to cutoff the higher frequency component than a predetermined noise cutoff frequency ωn [rad/s] and outputs the current command Ir.

$$Fn(s) = 1/(s/\omega n + 1) \tag{5}$$

As the result described above, the compensation calculation unit 9 performs a calculation expressed by the following transfer function C(s) as a whole thereof.

$$C(s) = Fn(s) \cdot \{Lg1(s) + Gh(s)\} \tag{6}$$

In addition, the above equation can be converted into the following Equations (7) to (10).

$$C(s) = \{b2 \cdot s^2 + b1 \cdot s + g0 \cdot \omega l\}/\{(s+\omega l) \cdot (s/+\omega l)\} \tag{7}$$

$$g0 = Kp1 + Kl1 \tag{8}$$

$$b1 = Kp1 + Kd1 \cdot \omega l \tag{9}$$

$$b2 = Kd1 \tag{10}$$

The transfer function C(s) of the compensation calculation unit 9 described in Equation (7) is selected so that ωl is a small value and ωn is a large value by desired characteristics described later, and the roots of a quadratic polynomial of the numerator, that is, two zero points are set to exist between ωl and ωn.

From Equation (7), the transfer function C(s) of the compensation calculation unit 9 approaches a steady gain with s of C(s) set to 0 in the frequency range lower than the low pass filter frequency ωl, and is approximated by the following equation.

$$C(s) \approx g0 \tag{11}$$

In addition, let the inverse number of ωn be 0 by assuming that the noise cutoff frequency is sufficiently high, the transfer function C(s) of the compensation calculation unit 9 is approximated by the following equation in the frequency range sufficiently higher than the zero point of C(s).

$$C(s) \approx b2 \cdot s \tag{12}$$

From Equations (10) and (12), the transfer function C(s) of the compensation calculation unit 9 can approximately set the characteristics by only Kd1 in the frequency range higher than the zero point of C(s) thereof. In addition, from Equations (8) and (11), the characteristics can be set by the sum of Kp1 and Kl1 in the frequency range lower than the low pass filter frequency ωl. Because the proportional gain Kp1 also changes a first order coefficient b1 of the numerator, when only a gain of a particularly low frequency range, that is a steady gain, is desired to be changed, it is only necessary to change only Kl1. That is, it is understood that the characteristics in the frequency range higher than the zero point and the characteristics in the lower frequency range can be independently set by Kl1 and Kd1, respectively.

Next, in order to explain the advantageous effect of the first embodiment, the correspondence between preferred characteristics of the compensation calculation unit 9, in particular, the transfer function C(s) of the compensation calculation unit 9 and close loop characteristics of the control system, which is a result of using it, is explained with reference to FIG. 3.

Figure 3:
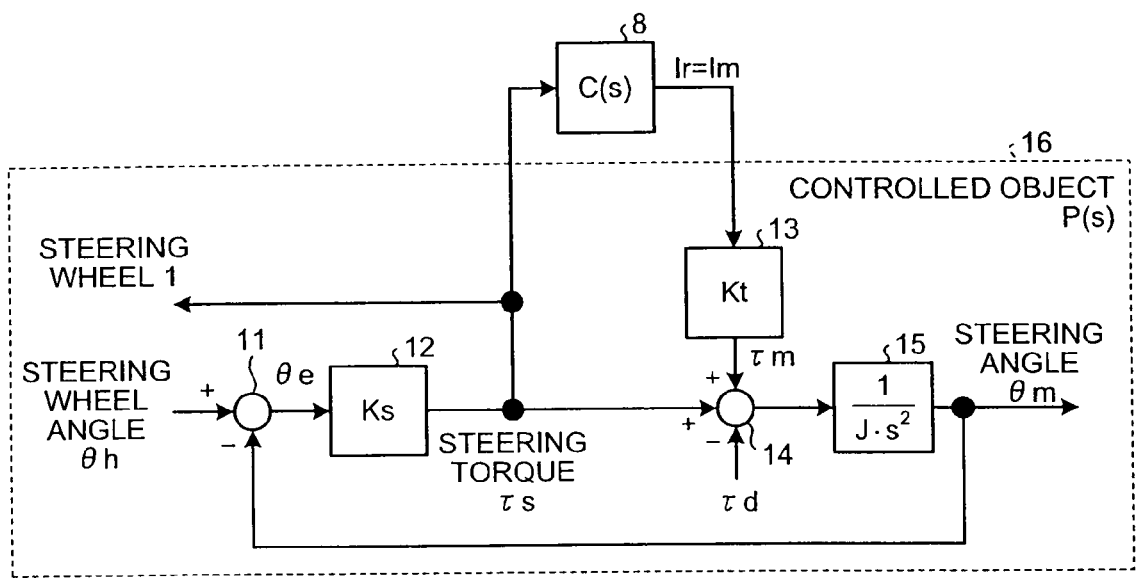
FIG. 3 is a schematic diagram for explaining a dynamic characteristic of the electric power-steering control apparatus according to the first embodiment.

FIG. 3 is a schematic diagram for explaining a dynamic characteristic of the electric power-steering control apparatus according to the first embodiment. Because the variation of the characteristics according to the vehicle speed is relatively moderate, the dynamic characteristics shown in FIG. 3 is explained by ignoring the variation of the characteristics.

In FIG. 3, when a driver rotates a steering wheel angle θh, which is an angle of the steering wheel 1, the steering column 2 performs an elastic deformation to generate the steering torque τs. More specifically, a relative angle θe is produced by means of an angle difference unit 11 that indicates the difference between the steering wheel angle θh and a steering angle θm (that is, a rotation angle of the wheels 6 and the motor 4), and the steering torque τs is generated when an elastic constant τs of the steering column 2 is multiplied in an elastic constant unit 12 for the relative angle θe. In addition, the steering torque τs is not only transmitted to the steering wheel 1, but also detected at the steering torque detector 3 (not shown in the figure), and input to the control unit 8. A motor current so as to agree with the current command Ir calculated in the control unit 8 is supplied to the motor 4. To simplify the explanation, let the current command Ir agree with the motor current Im, the transfer function of the control unit 8 becomes the transfer function C(s) of the compensation calculation unit 9. The motor torque τm is generated in the motor 4 by the motor current Im which is supplied from the control unit 8 to the motor 4. That is, for the motor current Im, the motor torque τm is generated by multiplying a torque constant Kt in a torque constant unit 13. Next, for a steering mechanism composed of the motor 4, the decelerating mechanism 5, the steering column 2, the wheels 6, and the like, the motor torque τm and the steering torque τs are added, and also a road surface reaction force τd is added in the reverse direction. That is, by a torque adder 14, a torque that the motor torque τm and the steering torque τs are added and a disturbance torques τd such as the road surface reaction force is subtracted applies on a steering mechanism inertia unit 15, and the steering angle θm is output as a result that the steering mechanism inertia unit 15 has been driven.

Next, properties from the current command Ir or the motor current Im, which is a control input (signal), to the steering torque τs, which is a detection value, that is, characteristics of a controlled object 16 are explained using a simple model. If the transfer function of the controlled object 16 is described as P(s), a simple model of P(s) is expressed by the following equation. In addition, the definition of the output of the controlled object P(s) in the mathematical expression is described by reversing the positive and negative signs to the steering torque τs in FIG. 3 as a matter of convenience of explanation as a normal classic control.

$$P(s)=Kt \cdot Ks/(J \cdot s^2 + D \cdot s + Ks) \quad (13)$$

In the equation above, J represents the moment of inertia of the steering mechanism inertia unit 15, and D represents a relatively small constant expressing effects such as a viscosity of deformation and a friction in the steering column 2. From the equation above, the controlled object P(s) is expressed as a secondary resonance system, and in the low frequency range lower than a few tens percent of the resonance frequency (about 10 [Hz]), the characteristics of the gain becomes flat for the frequency. In addition, in the high frequency range higher than a few times of the resonance frequency, the gain is substantially approximated by the characteristics of a second order integral system, and the gain decreases as the frequency increases and the phase becomes constant at about −180 [deg].

Although the main purpose of the electric power-steering control apparatus is to assist the steering torque τs in steering by the driver, by considering the fact that the force opposing to steering is mainly the road surface reaction force, it is possible to consider that the purpose of the electric power-steering control apparatus is to reduce the force that transfers from the road surface reaction force τd to the steering torque τs shown in FIG. 3 in preferable characteristics. Consequently, let the transfer function from the road surface reaction force τd to the steering torque τs call as steering sensitivity Sd(s). In addition, this steering sensitivity Sd(s) represents not only the effect of the road surface reaction force on the steering torque, but also the effect of the general disturbance torque applied to the steering column 2 such as a torque ripple generated at the motor 4 on the steering torque. Therefore, although it is necessary to consider the effect of the driver on the road feel, generally, the gain of the steering sensitivity Sd(s) is preferable to be small in a wider frequency range as far as possible.

When the transfer function of an open loop composed of the transfer function C(s) of the control unit 8, that is, the compensation calculation unit 9 and the controlled object P(s) is expressed by L(s) of the following equation, the steering sensitivity Sd(s) is expressed by Equation (15).

$$L(s)=C(s) \cdot P(s) \quad (14)$$

$$Sd(s)=P(s)/(1+L(s)) \quad (15)$$

Due to the effect of the denominator in Equation (15) described above, if the gain of the open loop L(s) is less than 1 (that is, 0 [dB]), it is understood that the gain reduction effect of the steering sensitivity Sd(s) cannot be sufficiently obtained. Therefore, the gain-crossover frequency at which the gain of L(s) crosses with 0 [dB] (hereinafter, referred to simply as the crossover frequency) becomes a significant indicator showing the performance of the control system. In addition, generally, a frequency called a control bandwidth corresponds to this crossover frequency.

As described above, the characteristics of the gain become flat when the controlled object P(s) has a frequency lower than the resonance frequency thereof, and the steady gain becomes a torque gain Kt. When the steering is assisted with a larger motor torque than the steering torque generated at the steering column 2 using the motor 4, that is, it can be easily understood that when the gain of the transfer function C(s) of the compensation calculation unit 9 is made larger than 1/Kt, the crossover frequency needs to be selected larger than the resonance frequency. In other words, the crossover frequency needs to be selected at a high frequency so that the resonance frequency that represents the dynamic effect of the elastic constant Ks on the steering column becomes a lower frequency range compared with the control bandwidth of the steering control apparatus.

Specifically, the resonance frequency of the controlled object P(s) is about 10 [Hz], and the value of the crossover frequency is selected to be larger than or equal to about 30 [Hz]. As a result, at near the normally selected crossover frequency, the value of the phase of the controlled object P(s) becomes close to −180 [deg].

Next, for the controlled object in which the phase of the crossover frequency is near −180 [deg] as described above, if the steering is controlled using only the similar proportional element as the elastic constant Ks of the steering column 2, the steering becomes vibrational by the similar characteristics as a spring and the stability is deteriorated. In addition, actually, in the control loop composed of the control unit 8 and the controlled object 16, because a phase lag caused by a modeling error for a simple model such as a control lag of the current control unit 10 and a detection lag in the steering torque detector 3, the control system diverges unstably. In such a feedback control system, in the crossover frequency, the phase of L(s) needs to be advanced by the amount called a phase margin compared with −180 [deg]. Moreover, this phase margin needs to be normally secured 30 [deg] or more.

The characteristics near the crossover frequency described above determines the characteristics in the higher frequency range compared with the lower frequency range that greatly affects the road feel of the driver described later; in order to advance the phase of the open-loop transfer function L(s) from −180 [deg] as described above, because the phase of the controlled object P(s) is near −180 [deg], the transfer function C(s) of the control unit 8, that is, the compensation calculation unit 9 needs to be advanced from 0 [deg]. Therefore, the transfer function C(s) of the compensation calculation unit 9 needs to have characteristics of differentiation or near the characteristics of pseudo differentiation. As a result, in the high frequency range near the crossover frequency, the gain of the transfer function of the compensation calculation unit 9 needs to have characteristics that the gain increases as the frequency increases.

Actually, however, the phase lag due to the noise filter 107 for removing noise which is the signal quantization error or the like and excited by differentiation, and the existence of the phase lag caused by the modeling error as described above, the feasible crossover frequency is limited by a ceiling.

Next, preferred characteristics in the low frequency range that greatly affects the road feel of the driver are explained. Generally, in the low frequency range lower than 1 Hz to a few Hz, the effect of the road surface reaction force needs to be naturally transferred to the driver, that is, the steering wheel 1. For this reason, the steering sensitivity Sd(s) described above needs to be constant in the low frequency range, that is, the frequency characteristics of the gain needs to be flat.

In the low frequency range sufficiently lower than the crossover frequency, normally, the gain of the open-loop transfer function L(s) is sufficiently larger than 0 [dB]. That is, it is expressed by the following equation.

$$|L| \gg 1 \quad (16)$$

From Equations (14) to (16), the steering sensitivity Sd(s) in the low frequency range is approximated by the following equation.

$$|Sd| \approx |P|/|L| = 1/|C| \quad (17)$$

From the above equation, in the low frequency range where Equation (16) holds, the gain characteristics of the steering sensitivity Sd(s) is approximated to the inverse of the gain of the transfer function C(s) of the compensation calculation unit 9. Therefore, in order to realize the gain of the steering sensitivity Sd(s) to be flat for the frequency in the low frequency range, it is understood that the gain of the transfer function C(s) of the compensation calculation unit 9 needs to make flat for the frequency. In addition, generally, in such a situation as when the vehicle speed is low, in particular, it is preferable to increase the assist ratio which is a ratio of assisting the steering force using the motor torque τm to the steering torque τs. That is, it is preferable that the steady gain of the steering sensitivity Sd(s) is made small by making the steady gains of the transfer function C(s) and the open-loop transfer function L(s) large. On the other hand, in order to make the road feel of the driver appropriate according to the driving situation, it is sometimes preferable that the assist ratio, that is, the steady gain of the transfer function C(s) of the compensation calculation unit 9 is not made too large according to the vehicle speed and the magnitude of the steering torque τs. That is, the characteristics in the low frequency range of the transfer function C(s) of the compensation calculation unit 9 is determined for adjusting the road feel according to the driving situation.

As described above, it is preferable to design the transfer function C(s) and the open-loop transfer function L(s) so as to make their gains as large as possible in the high frequency range near the crossover frequency while assuring the stability of the control system for the purpose of increasing the compensation effect for the general disturbance. The limit strongly depends on the hardware performances of the controlled object 16 and the control unit 8, but nearly constant characteristics without depending on the driving situation are preferable unless the characteristics of the controlled object 16 greatly changes. On the other hand, the characteristics in the low frequency range and the steady gain are designed for the purpose of enhancing the road feel of the driver. In addition, the characteristics on this road feel are made to change according to the driving situation, such as the magnitude of the steering torque τs and the vehicle speed. That is, the transfer function C(s) and the open-loop transfer function L(s) need to be designed from the different points of view between the low frequency range and the high frequency range.

Next, preferable characteristics in the mid frequency range that corresponds to the intermediate between the low frequency range and the high frequency range (a domain near the crossover frequency) is explained. As described above, there is a limit in the feasible crossover frequency. On the other hand, as described above, generally, it is preferable to increase the gain of the open-loop transfer function L(s). If, the crossover frequency can be made a few times higher than the low frequency range that greatly affects the road feel described above, in the mid frequency range that is the intermediate between the low frequency range and near the crossover frequency, if the characteristics of the transfer function C(s) of the compensation calculation unit 9 are made so that the gain decreases as the frequency increases, conversely, the gain increases as the frequency decreases, the gain in the low frequency range can be made to increase even though the gain near the crossover frequency is limited. In order to realize such characteristics, it is only necessary to make the characteristics of the transfer function C(s) of the compensation calculation unit 9 be approximated to integral characteristics in the mid frequency range. That is, in the transfer function C(s) of the compensation calculation unit 9, it can be realized by making to have a pole at a frequency between the low frequency range where the characteristics of flat gain are preferable and the mid frequency range. In addition, as a result, in this mid frequency range, the phase of the transfer function C(s) of the compensation calculation unit 9 lags more than 0 [deg].

As a configuration of the compensation calculation unit 9 that has preferable characteristics of the transfer function C(s), the calculation order is low, and the calculation thereof is simple, a configuration is expressed by the product of the lag-lead filter and the gain described also in Japanese Patent Application Laid-open No. H7-309250 and Japanese Patent Application Laid-open No. H7-309247. In order to contrast with the in the first embodiment, the feature of the compensation calculation unit 9 expressed by the product of such the lag-lead filter and the gain is explained.

The transfer function of the compensation calculation unit 9 expressed by the product of the lag-lead filter and the gain is shown in Equation (18), where z1 and p1 are a zero point and a pole of the phase lag compensation filter, respectively, and p1<z1. In addition, z2 and p2 are a zero point and a pole of the phase-lead compensation filter, respectively, and z2<p2. As described above, p1 is set to the boundary of the low frequency range and the mid frequency range, p2 is set to a larger value than the crossover frequency for removing a noise or other purposes, and z1 and z2 are set to values between p1 and p2 and correspond to the boundary of the mid frequency range and the high frequency range.

$$C(s)=K0\cdot\{(s/z1+1)/(s/p1+1)\}\cdot\{(s/z2+1)/(s/p2+1)\} \quad (18)$$

In the above equation, the lag-lead filter composed of the product of the phase lag compensation filter and phase-lead compensation filter is usually selected so that the steady gain becomes 1 as described in Japanese Patent Application Laid-open No. H7-309250 and Japanese Patent Application Laid-open No. H7-309247. This can be known by analogy from the meaning that the word "filter" has. The steady gain of the entire C(s) using such a lag-lead filter is set by the gain K0 that is multiplied to the entire C(s).

Because, p1 and p2 have the same meanings as ω1 and ωn in the first embodiment, if they are replaced, the transfer function thereof of Equation (18) becomes equivalent to the first embodiment shown in Equation (7). When the compensation calculation unit by means of the product of the lag-lead filter and the gain is equivalently converted to the first embodiment, coefficients of the numerator polynomial become as follows.

$$g0=K0 \quad (19)$$

$$b1=K0\cdot\omega l(1/z1+1/z2) \quad (20)$$

$$b2=K0\cdot\omega l/(z1\cdot z2) \quad (21)$$

As explained in Equations (11) and (12), the gain of C(s) in the low frequency range is determined by g0, and the characteristics near the crossover frequency in the high frequency range are approximated by only b2. In addition, as explained above, because the characteristics in the low and high frequency ranges should be designed and adjusted from the different points of view, b2 and g0 need to be determined from the different points of view. However, the calculation of C(s) is performed with the configuration of the product of the lag-lead filter and the gain expressed by Equation (18), the entire transfer function is multiplied by the gain K0. In addition, although the pole ω1 (=p1) is also adjusted from the view point of road feel, when these gain K0 and the pole ω1 of the filter are changed, b2 also changes. That is, it is understood that the characteristics in the high frequency range, which are preferable to be set fundamentally to as high a value as possible and not to be changed, might also be changed.

For example, after C(s) is determined so that it becomes optimum while K0 is a large value, when K0 is decreased, the crossover frequency decreases down to the frequency range that is originally designed as the mid frequency range. As a result, in the mid frequency range described above, because the characteristics are made to lag the phase, there arises a problem that the stability of the control system also degrades.

In the technique described in Japanese Patent Application Laid-open No. H7-309250, the problem described above is responded by changing ω0 by successively calculating the variation of K0 described above, so the calculation and design become complex. In addition, in the technique described in Japanese Patent Application Laid-open No. H7-309247, the problem described above is responded by adding the blending filter in serial so as to reduce only the gain in the low frequency range using the assist curve, that is, by configuring to add the phase lead compensations, thereby causing increases of calculation amount and design procedure.

On the other hand, since the compensation calculation unit 9 according to the first embodiment is configured as described above, the characteristics in the high frequency range near the crossover frequency that is preferable to be set as high as possible can be determined by b2, that is, Kd1, and the characteristics in the low frequency range that is closely related to the road feel can be independently determined by g0, that is, Kl1 using a simple calculation with the same order as that of the lag-lead filter. Therefore, systematic and simple design becomes possible.

In addition, as described above, by using the assist curve that is a nonlinear gain determined to realize the road feel according to the steering torque τs and the vehicle speed, Kl1 that is the linearized gain of the assist curve is varied at desired characteristics; also on that occasion, the characteristics in the high frequency range is determined by Kd1, so desired characteristics can be realized with a simple calculation without degrading the characteristics near the crossover frequency that greatly affects the stability.

A comparison with a general motor control apparatus not limited to the electric power-steering control apparatus is described here. In the transfer function C(s) of the compensation calculation unit 9 in the first embodiment shown in Equation (7), after replacing g0·ω1 with the constant Ki1, when the low pass filter frequency is made to approach to 0, it is understood that the transfer function C(s) of Equation (7) is the same as a form of controller called a PID control in which Kp1, Kd1, and Ki1 are made as a proportional gain, a differential gain, and a integral gain, respectively, added with a noise removing filter. In the electric power-steering control apparatus, because a torque is generated in the motor 4 so as to assist the steering torque τs, it is typical to design the apparatus based of the point of view that the motor torque τm is generated by amplifying the detection value of the steering torque τs. For this reason, it is typical to perform the compensation by configuring in serial the amplifier using the assist curve determined by taking the road feel into consideration and the filter for securing the stability. On the other hand, in the electric power-steering control apparatus, although there is no command values for the position and the velocity like the general motor control apparatus, in the configuration diagram FIG. 3 showing the dynamic characteristics of the electric power-steering control apparatus, if the steering wheel angle θh is regarded as a command value, it can be said that the control unit 8 plays a role to reduce the relative angle, that is, the deviation between the steering wheel angle θh that is regarded as a position command value and the steering angle θm. In other words, the electric power-steering control apparatus can be regarded as a similar one as the PID control that performs the motor angle control. In addition, a problem of reducing the gain of the steering sensitivity Sd(s) is similarly regarded as shaping the characteristics of a disturbance response in the motor position control. When performing such a motor angle control, the control method based on the PID control is widely adopted, a lot of knowledge has been conventionally systematized. From also the viewpoint that such knowledge can be utilized, it is said to be able to perform a systematic and simple design for the electric power-steering control apparatus in the first embodiment.

On the other hand, in the electric power-steering control apparatus, unlike the general motor position control apparatus, there are special requests such as that a pure integral compensation that converges the steady value of the relative angle θe into 0 cannot be conducted and that the characteristics in the low frequency range need to be designed from the viewpoint of the road feel. The first embodiment responds to such requests, and has advantageous effects specific to the electric power-steering control apparatus.

Figure 4:
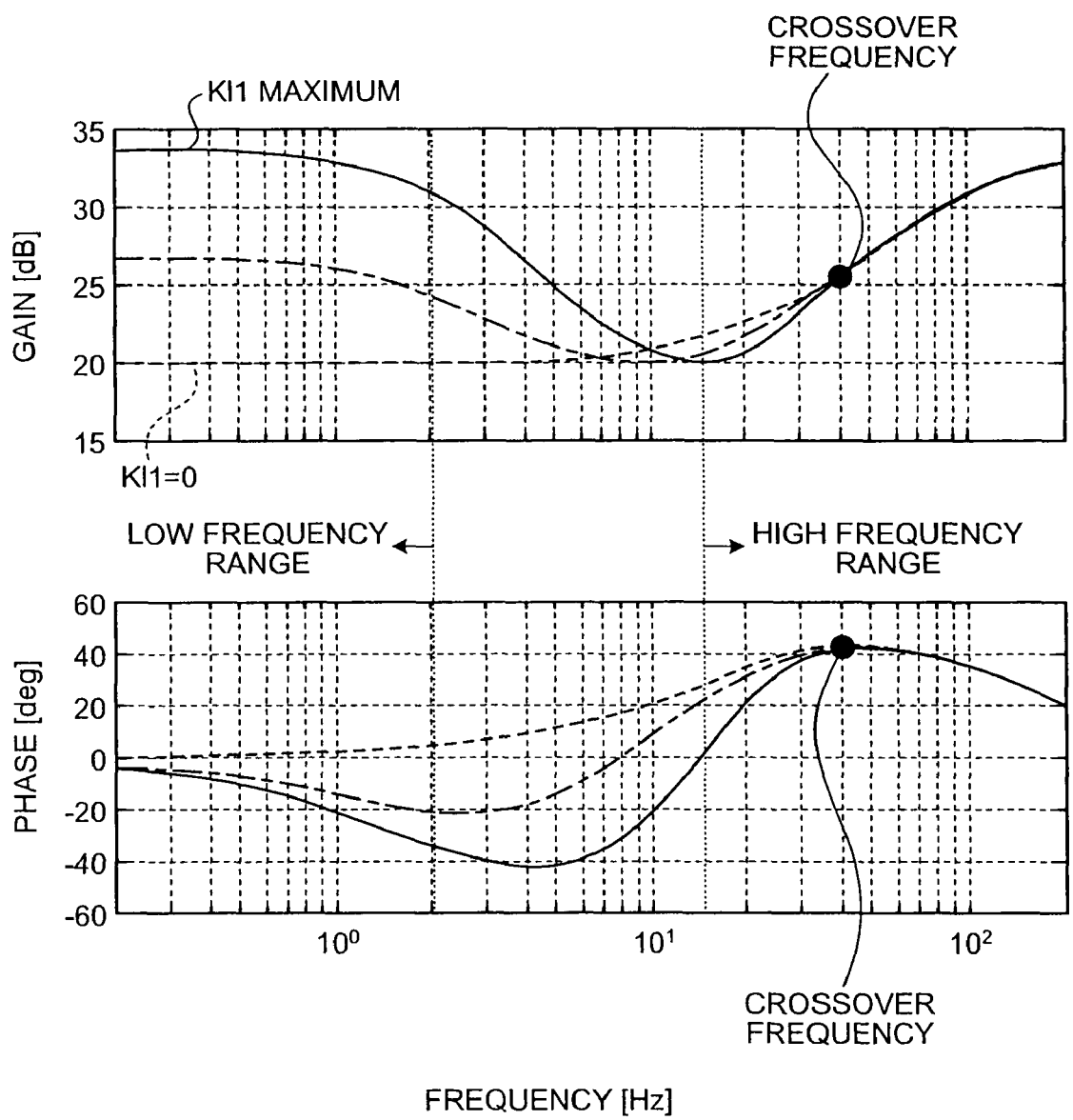
FIG. 4 is a graph showing a frequency response of the control unit in the electric power-steering control apparatus according to the first embodiment.
Figure 5:
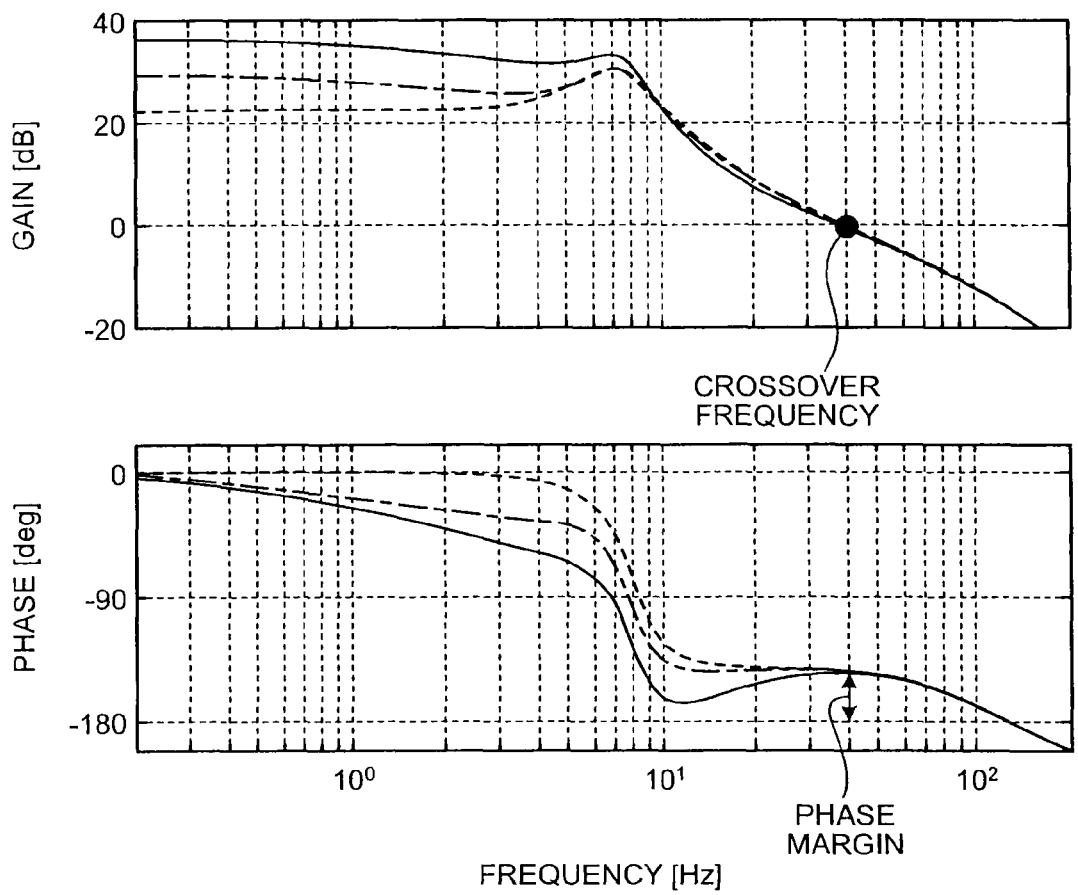
FIG. 5 is a graph showing a frequency response of an open-loop transfer function using the electric power-steering control apparatus according to the first embodiment.
Figure 6:
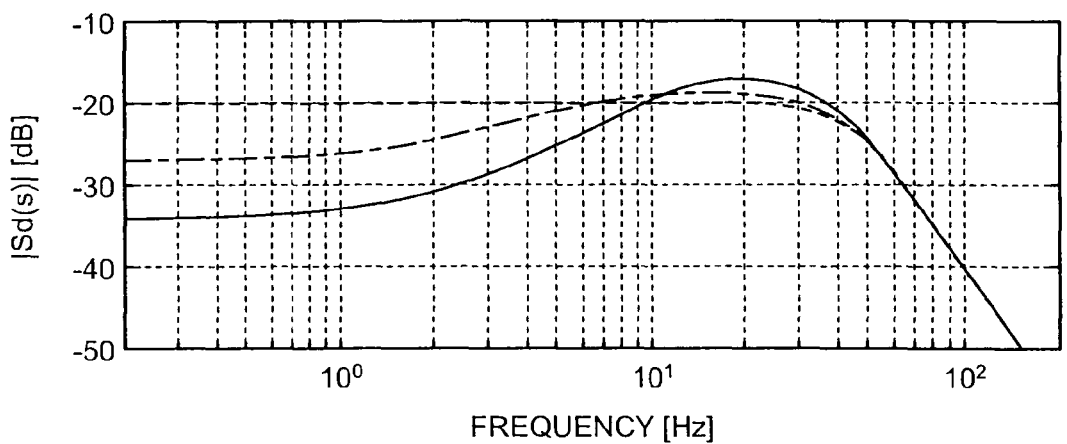
FIG. 6 is a graph showing a frequency response gain of a steering sensitivity using the electric power-steering control apparatus according to the first embodiment.

Next, advantageous effects of the first embodiment are explained using graphs of simulation results. FIG. 4 is a graph showing a frequency response of the transfer function C(s) of the compensation calculation unit 9 when the first embodiment is used, FIG. 5 is a graph showing a frequency response of the open-loop transfer function L(s), and FIG. 6 is a graph showing a frequency response gain of the steering sensitivity Sd(s). In each figure, the graph is shown with a thick solid line when the linearized gain Kl1 of the assist curve in low-frequency amplification unit 103 is a maximum, with a broken line when Kl1 is 0, and with a chain line when Kl1 is intermediate between the maximum and 0. The controlled object P(s) used in these simulations has a resonance frequency of 8 [Hz].

A method for determining each gain of the transfer function C(s) of the compensation calculation unit 9 in this simulation is explained. As described above, the crossover frequency is determined by considering an adverse effect due to noise and other effects. This is, the differential gain Kd1 of the high-frequency compensation unit 105 corresponding to the crossover frequency and the noise cutoff frequency (on of the noise filter 107 is determined. In this simulation, the crossover frequency is set to 40 [Hz], and the noise cutoff frequency ωn is set to 2.5 times of the crossover frequency.

Next, by considering the road feel, the low pass filter frequency ωl of the low pass filter 102 corresponding to the upper limit of the low frequency range is determined. In this simulation, 2 [Hz] is selected for the low pass filter frequency ωl.

Next, the proportional gain Kp1 in the proportional compensation unit 104 and the linearized gain Kl1 of the assist curve in the low-frequency amplification unit 103 is determined so as to be as high as possible without too much delaying the phase of the open-loop transfer function L(s) near the crossover frequency. Determining Kp1 and Kl1 in such a way is to determine the zero point of the transfer function C(s) of the compensation calculation unit 9 shown in Equation (7) to be about a few tens percent of the crossover frequency.

Although the transfer function C(s) of the compensation calculation unit 9 by the product of the lag-lead filter and the gain shown in Equation (18) can normally select only a real-numbered zero point, the compensation calculation unit C(s) shown in Equation (7) can select a complex-numbered zero point in the first embodiment, so the feasible range of the control characteristics becomes broad by just that much. In addition, by selecting the zero point to a complex number, it becomes possible to make the variation of the gain and the variation of recovering the phase near the zero point precipitous, thereby enabling to more increase the gain in the low frequency range in the open-loop transfer function L(s) without degrading the stability margin near the crossover frequency. In also this simulation, a complex number is selected for the zero-point of which damping coefficient is less than 1.

Next, the assist curve in the low-frequency amplification unit 103 is determined so that the linearized gain Kl1 changes according to the purpose of making the road feel adequate corresponding to the magnitude of the steering torque τs and the vehicle speed within the range not exceeding the upper limit described above.

In the first embodiment, with only the procedure described above, all the constants of the compensation calculation unit C(s) shown in the first embodiment can be determined.

From FIGS. 4 and 5, it is understood that by changing the linearized gain Kl1 of the assist curve in the low-frequency amplification unit 103, the transfer function C(s) and the open-loop transfer function L(s) of the compensation calculation unit 9 greatly change the gains in the low frequency range; on the other hand, the variation in the high frequency range near the crossover frequency is small, and the gain and the phase at the crossover frequency hardly changes and ensures desired 30 [deg] for the phase margin.

In addition, as a result of having designed as described above, it is understood that the gain of the steering sensitivity Sd(s) shown in FIG. 6 is always flat as desired in the low frequency range, the increase of the gain of Sd(s) due to the degradation of stability does not occur even if the linearized gain Kl1 decreases, and only the gain increase in the low frequency range following the design is obtained as desired characteristics.

From these points, it is understood that the design and the operation of the compensation calculation unit 9 with separating the high frequency range from the low frequency range can be realized.

In addition, in the first embodiment, in the low-frequency compensation unit 101, it was explained that the low pass filter calculation is performed after the amplification calculation in the low-frequency amplification unit 103 is performed; but, even if the order of there calculations are interchanged, a signal having the frequency response characteristics for multiplying the linearized gain Kl1 and the low pass filter is generated, and the similar effects can be obtained as well. However, because the low-frequency amplification unit 103 is generally made to have the characteristics that include a dead band with a small output variation for a tiny input variation, if supposing a situation that the steering torque τs precipitously performs a large change, as explained above, when the low pass filter calculation is performed by the low pass filter 102 after the steering torque τs is amplified by the low-frequency amplification unit 103, the input of the low pass filter 102 is immediately changed largely, so although the rising edge of the output of the low-frequency compensation unit 101 is blurred, reacts immediately. On the other hand, if a calculation in which the order of these calculations is reversed is performed, the dead band is acted by the low-frequency amplification unit 103 after the rising edge of the steering torque τs is made blurred by the low pass filter 102. As a result, a phenomenon that the output of the low-frequency amplification unit 103 does not react just after raising the steering torque occurs; so there is a difference that the reaction of the output of the low-frequency compensation unit 101 becomes delayed.

In addition, in the proportional compensation unit 104, it is explained that only the proportional gain Kp1 is multiplied, but as is understandable from the explanations of Equations (11) and (12), the proportional gain Kp1 does not also contribute to the characteristics near the crossover frequency. Therefore, it is acceptable that the proportional compensation unit 104 can also perform a nonlinear calculation using, for example, the assist curve like the low-frequency compensation unit 101.

Moreover, the differential gain Kd1 in the high-frequency compensation unit 105 can be regarded as a fixed value if the characteristics of the controlled object P(s) do not change, but in some situations such as when the characteristics of the controlled object P(s) change depending on the vehicle speed, the differential gain Kd1 can be changed according to the intended use.

As described above, in the explanation in the first embodiment, in a multiplication, which is not mentioned as nonlinear, in particular, nonlinear processing can be applied; in addition, in also such a situation, the characteristics of each unit inside the compensation calculation unit 9 can be determined by taking the frequency response characteristics in a minute vibration into consideration.

In addition, in the calculation of each unit inside the compensation calculation unit 9, it is needless to say that an approximate calculation which does not greatly affect the operation of the entire compensation calculation unit 9 can be performed. For example, in the calculation of the characteristics of the low pass filter, that is, the low pass filter 102 described as having the characteristics that the high-pass gain becomes 0, the high-pass gain can have a small value. In addition, in the calculation of the proportional compensation unit 104, it is needless to say that, for example, a low pass filter that removes higher frequency components than the crossover frequency can be applied. Moreover, the characteristics of the high-frequency compensation unit 105 are described as differential or pseudo differential characteristics, but even if the characteristics are made so that the frequency response of the gain is flat in the frequency range sufficiently lower than the crossover frequency, and the high-frequency compensation unit 105 has characteristics of a minute steady gain compared with the proportional compensation unit 104, the effect on the entire control system is minute, and it is needless to say that such characteristics are also included within the range of the claims in the present invention. Furthermore, in the high-frequency compensation unit 105, in such a situation as when a high-frequency noise is suppressed from exciting using the pseudo differentiation, it is needless to say that the noise filter 107 can be omitted.

Moreover, although the present embodiment was configured to add the output of the phase-lag compensation unit 110 and the output of the high-frequency compensation unit 105 using an adder 116, it is needless to say the adder 116 can be integrated into the adder 106 in the phase-lag compensation unit 110.

As described above, according to the first embodiment, because this apparatus includes the low-frequency compensation unit which performs the amplification for the steering torque signal by means of the gain determined by the assist curve and applies the low pass filter, the proportional compensation unit that performs the amplification calculation for the torque signal by means of the proportional gain, and the phase-lag compensation unit which realizes the characteristics for multiplying the phase-lag compensation by a constant by adding these calculation results to calculate the current command based on the output of the phase-lag compensation unit, this apparatus can calculate the current command with a simple calculation as well as set the low frequency characteristics independently. In other words, it is possible to obtain the steering control apparatus that the calculation amount is small and the design is systematic and simple. Furthermore, because this apparatus includes the high-frequency compensation unit which applies the amplification by means of the differential gain and differentiation or the pseudo differentiation for the signal based on the steering torque to calculate the current command based on the value of which the output of the high-frequency compensation unit is added to the output of the phase-lag compensation unit, the high frequency characteristics can also be set independently from the low frequency characteristics, thereby enabling to realize desired characteristics of the electric power-steering control apparatus that meets the requirements of the road feel and the stability thereof.

Figure 7:
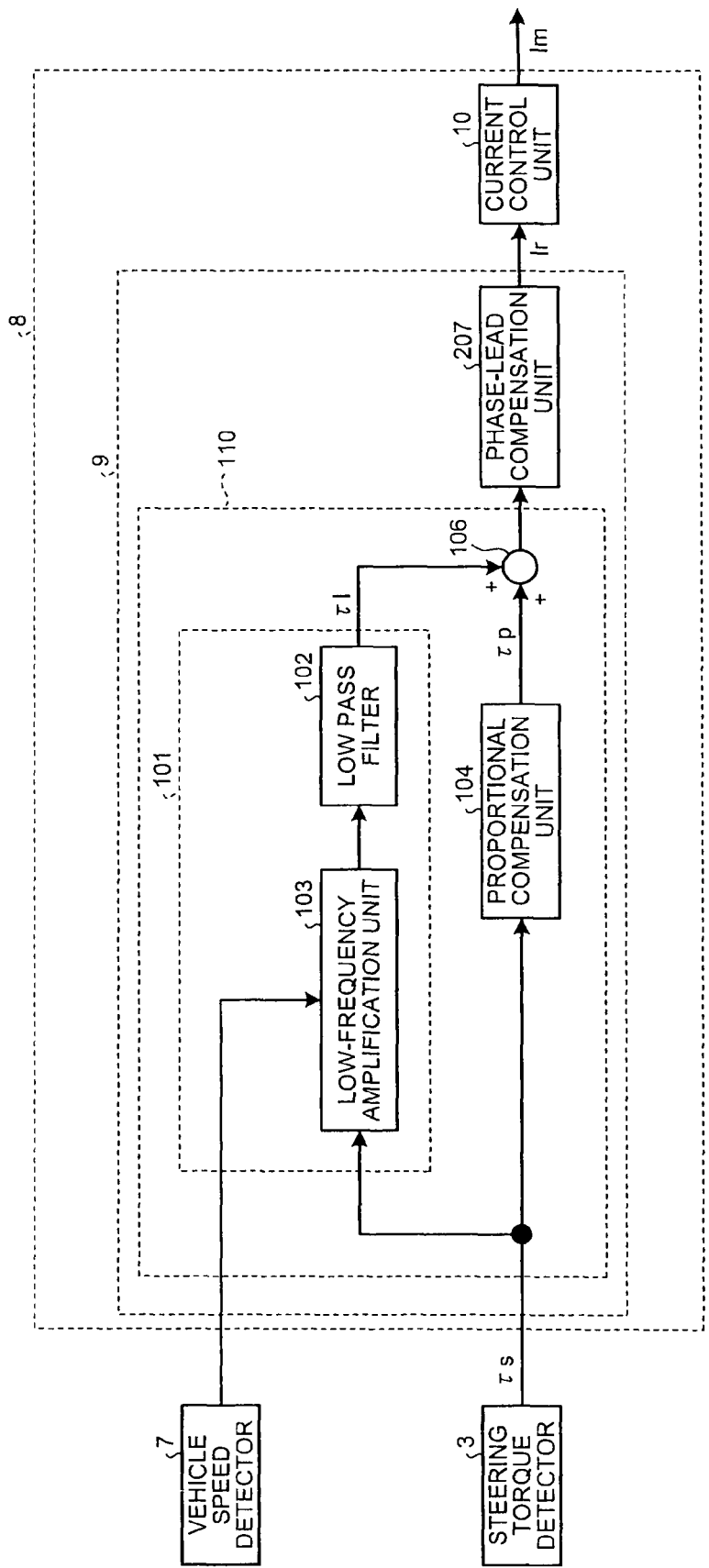
FIG. 7 is a block diagram of a control unit in an electric power-steering control apparatus according to a second embodiment of the present invention.

Next, an electric power-steering control apparatus according to a second embodiment of the present invention will be explained. The whole configuration is the same as shown in FIG. 1 and the explanation thereof is abbreviated. FIG. 7 is a block diagram of a control unit 8 according to the second embodiment with the same letter or numeral put for the same unit as the first embodiment. The control unit 8 according to the second embodiment uses the same phase-lag compensation unit 110 as in the first embodiment, in addition to removing the high-frequency compensation unit 105 and replacing the noise filter 107 with a phase-lead compensation unit 207.

The control unit 8 includes the compensation calculation unit 9 and the current control unit 10, and inputs the steering torque τs detected by the steering torque detector 3 and the vehicle speed detected by the vehicle speed detector 7 in the compensation calculation unit 9. The compensation calculation unit 9 outputs the current command Ir as a result of performing the calculation described later. The current control unit 10 controls the current Im of the motor 4 so that the current Im agrees with the current command calculated in the compensation calculation unit 9.

Next, the calculation operation of the compensation calculation unit 9 is explained. The compensation calculation unit 9 inputs the steering torque τs in the phase-lag compensation unit 110. Since the phase-lag compensation unit 110 performs the same operation as that in the first embodiment, the detailed explanation thereof is omitted. The transfer function of the phase-lag compensation unit 110 is expressed by Equation (2) as in the first embodiment.

Next, the compensation calculation unit 9 inputs the output of the phase-lag compensation unit 110 in the phase-lead compensation unit 207.

Next, the phase-lead compensation unit 207 performs the calculation of the phase-lead compensation filter expressed by Fld(s) of the following equation so as to have the low-pass gain being 1, a zero point of the phase-lead frequency $\omega ld$, and a pole of a predetermined noise cutoff frequency $\omega n$ [rad/s] to output the current command Ir.

$$Fld(s)=(s/\omega ld+1)/(s/(\omega n+1)) \quad (22)$$

As a result described above, the compensation calculation unit 9 performs the calculation expressed by the following transfer function C(s) as a whole thereof.

$$C(s)=Fld(s)\cdot Lg1(s) \quad (23)$$

In addition, Equation (23) can be converted into the following Equations (24) to (27).

$$C(s)=\{b2\cdot s^2+b1\cdot s+g0\cdot \omega l\}/$$

$$\{(s+\omega l)\cdot(s/\omega n+1)\} \quad (24)$$

$$g0=Kp1+Kl1 \quad (25)$$

$$b1=Kp1+(Kp1+Kl1)\cdot \omega l/\omega ld \quad (26)$$

$$b2=Kp1/\omega ld \quad (27)$$

It is understood that Equation (24) described above is exactly the same as Equation (7) which expresses the transfer function C(s) of the compensation calculation unit 9 in the first embodiment, and the coefficients expressed by Equations (8) to (10) are substituted with Equations (25) to (27).

As explained in the first embodiment, the low pass filter frequency $\omega l$ determines the low frequency range related to the road feel and is set to lower than the crossover frequency, and the noise cutoff frequency $\omega n$ is set to higher than the crossover frequency. As a result, the characteristics of the transfer function C(s) of the compensation calculation unit 9 are virtually determined by b2 near the crossover frequency in the high frequency range and g0 in the low frequency range.

In the second embodiment, the phase-lead compensation unit 207 is connected in serial inside the compensation calculation unit 9; as a result, the transfer function C(s) of the compensation calculation unit 9 includes the real-numbered zero point (ωld) of the phase-lead compensation unit 207 as a zero point, and the zero point is restricted to a real number. Consequently, in comparison with the first embodiment, the feasible range of the characteristics of the transfer function $C(s)$ of the compensation calculation unit 9 is restricted, and there are also some restrictions in the performance thereof.

Moreover, in the second embodiment, from Equation (27) described above, a coefficient b2 that determines the characteristics in the high frequency range is determined by the ratio between the proportional gain Kp1 and the phase-lead frequency ωld; moreover, because the proportional gain Kp1 changes also the coefficient b1, the parameters that determine the characteristics in the high frequency range becomes more complex than those in the first embodiment. In addition, in order to determine the characteristics in the high frequency range, if the coefficient b2 is changed using the proportional gain Kp1, a coefficient g0 is also changed and the characteristics in the low frequency range are also changed.

However, also in the second embodiment, linearized gain Kl1 in the low-frequency amplification unit 103 of the low-frequency compensation unit 101 relates only to the coefficient g0, so with the setting of the linearized gain Kl1, the characteristics in the low frequency range can be independently set from these in the high-frequency range.

An example of design procedure for the compensation calculation unit 9 in the second embodiment is explained. The phase-lead frequency (zero point) in the phase-lead compensation unit 207 is set to a few tens percent of a desired crossover frequency to set the noise cutoff frequency ωn higher than the desired crossover frequency. Next, by increasing the proportional gain Kp1 in the proportional compensation unit 104, the crossover frequency corresponding to the coefficient b2 in Equation (27) is increased to a desired value. Next, the low-pass filter frequency is set to a low frequency from the viewpoint of road feel to increase the linearized gain Kl1 in the low-frequency amplification unit 103 so far as the phase of the open-loop transfer function near the crossover frequency does not lag. After that, the assist curve in the low-frequency amplification unit is determined as in the first embodiment.

By setting the second embodiment as described above, it is possible to realize the characteristics of the control system for the variation of the linearized gain Kl1 of the low-frequency amplification unit 103 nearly the same as those in the first embodiment, though there are some restrictions compared with the first embodiment. In addition, the order of the compensation calculation unit 9 is equal to that in the first embodiment, and the calculation amount is very small.

In addition, in the second embodiment, the essence of the reason why the characteristics of the compensation calculation unit 9 in the low frequency range can be independently set from those in the high frequency range, is that as in the first embodiment, in the phase-lag compensation unit 110, the calculation result of the low-frequency compensation unit 101 and the calculation result of the proportional compensation unit 104 are added by the adder 106, and the calculation of the current command Ir is performed based on the result thereof.

Moreover, in the first embodiment, it was described that the proportional compensation unit 104 can perform a nonlinear amplification calculation using the similar assist curve as the low-frequency compensation unit 101 because the characteristics in the high frequency range can be designed independently using the differential gain Kd1 of the high-frequency compensation unit 105; however, in the second embodiment, as described above, when the proportional gain Kp1 of the proportional compensation unit 104 is changed, the characteristics in the high frequency range is also changed. Therefore, it is undesirable that the proportional gain Kp1 of the proportional compensation unit 104 is made to be a nonlinear gain exactly as the low-frequency amplification unit 103 of the low-frequency compensation unit 101. However, an amplification calculation with a weak nonlinearity compared with the nonlinear gain on the low-frequency amplification unit 103 can be performed.

As described above, according to the second embodiment, as in the first embodiment, because this apparatus includes the low-frequency compensation unit which performs the amplification for the steering torque signal by means of the gain determined by the assist curve and applies the low pass filter, the proportional compensation units that performs the amplification calculation for the torque signal by means of the proportional gain, and the phase-lag compensation unit which realizes the characteristics for multiplying the phase-lag compensation by a constant by adding these calculation results to calculate the current command based on the output of the phase-lag compensation unit, this apparatus can calculate the current command with a simple calculation as well as set the low frequency characteristics independently from these in the high frequency range. In other words, it is possible to obtain the steering control apparatus that the calculation amount is small and the design is systematic and simple, thereby enabling to realize desired characteristics of the electric power-steering control apparatus that meets the requirements of the road feel and the stability thereof.

Figure 8:
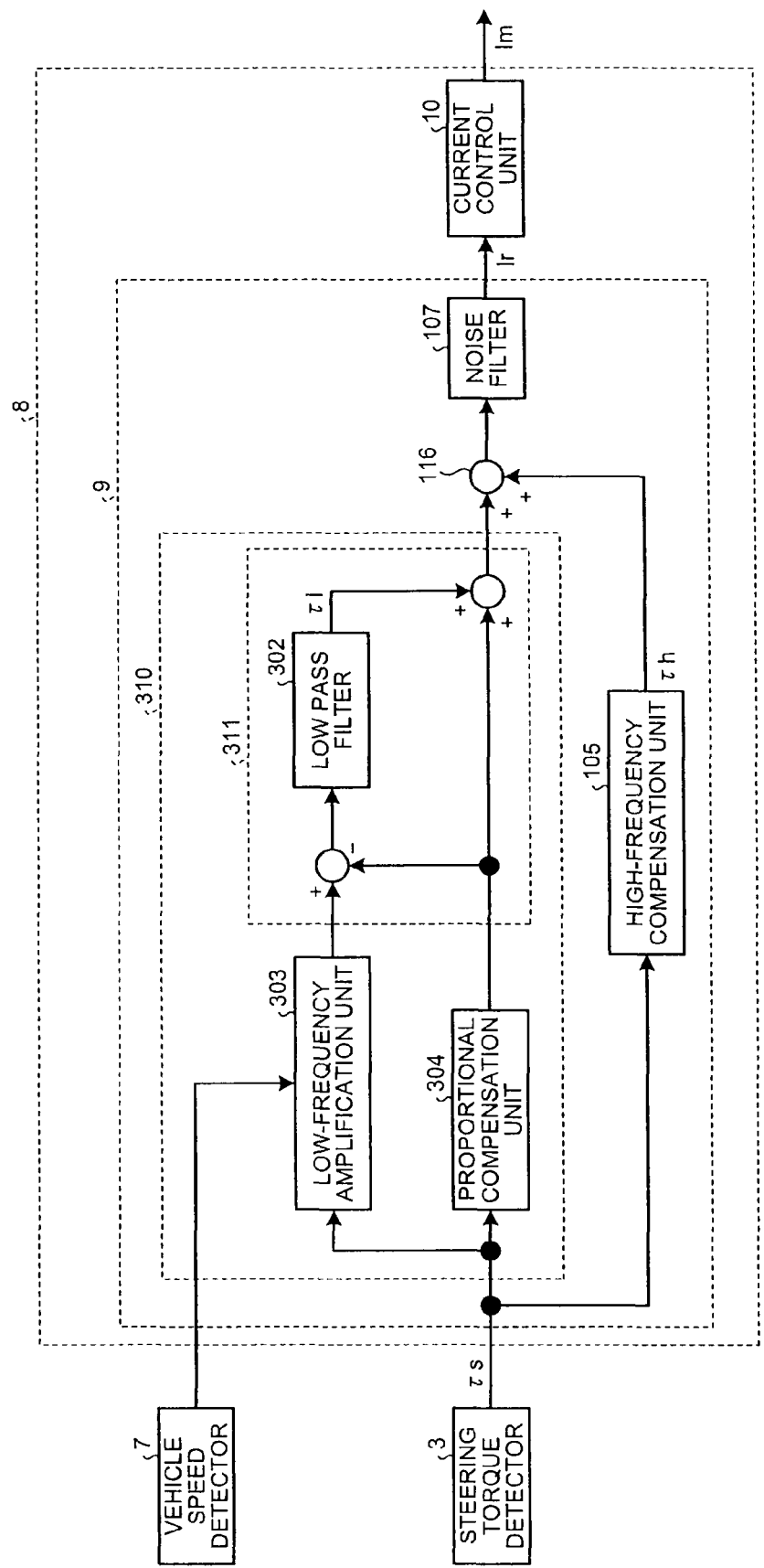
FIG. 8 is a block diagram of a control unit in an electric power-steering control apparatus according to a third embodiment of the present invention.

Next, an electric power-steering control apparatus according to a third embodiment of the present invention will be explained. The whole configuration is the same as shown in FIG. 1 and the explanation thereof is abbreviated. FIG. 8 is a block diagram of a control unit 8 according to the third embodiment with the same letter or numeral put for the same unit as the first embodiment. The third embodiment replaces the phase-lag compensation unit 110 in the first embodiment with a phase-lag compensation unit 310 that performs an equivalent calculation with a different configuration.

The control unit 8 includes a compensation calculation unit 9 and a current control unit 10, and inputs the steering torque signal τs detected by the steering torque detector 3 and the vehicle speed detected by the vehicle speed detector 7 in the compensation calculation unit 9. The compensation calculation unit 9 outputs the current command Ir as a result of having performed the calculation described below. The current control unit 10 controls so that the current Im of the motor 4 agrees with the current command Ir calculated in the compensation calculation unit 9.

Next, the calculation operation of the compensation calculation unit 9 is explained. The compensation calculation unit 9 inputs the steering torque τs in the phase-lag compensation unit 310. The phase-lag compensation unit 310 inputs the steering torque τs in a low-frequency amplification unit 303. The low-frequency amplification unit 303 outputs, as in the low-frequency amplification unit 103 in the first embodiment, the result of calculation for amplifying the signal by a nonlinear gain, which varies according to the steering torque τs and the vehicle speed, determined by the assist curve. The linearized gain of the nonlinear gain in the low-frequency amplification unit 303 is described as Kl3.

Next, the phase-lag compensation unit 310 inputs the steering torque τs in a proportional compensation unit 304; the proportional compensation unit 304 performs the calculation for multiplying a proportional gain Kp3 which is a predetermined value for the input, and output the result thereof. However, the calculation in the proportional compensation unit 304 can be a nonlinear amplification calculation using the assist curve as in the low-frequency amplification unit 303.

Next, the phase-lag compensation unit 310 inputs the output of the low-frequency amplification unit 303 and the output of the proportional compensation unit 304 in a frequency combining filter 311. The frequency combining filter 311 inside the filter thereof inputs a signal of which the output of the proportional compensation unit 304 is subtracted from the output of the low-frequency amplification unit 303 in a low pass filter 302. The low pass filter 302 outputs the result of performing the low pass filter calculation with the low pass filter frequency $\omega l$ like the calculation in the first embodiment, though the input is different from the low pass filter 102 in the first embodiment. Next, the frequency combining filter 311 outputs the result of adding the output of the low pass filter 302 and the output of the proportional compensation unit 304, and the phase-lag compensation unit 310 outputs the output of the frequency combining filter 311.

In the phase-lag compensation unit 310 described above, a transfer function $Gl(s)$ from the input of the low-frequency amplification unit 303 to the output of the frequency combining filter 311, a transfer function $Gp(s)$ from the input of the proportional compensation unit 304 to the output of the frequency combining filter 311, a transfer function $Lg3(s)$ from the steering torque $\tau s$, which is the input of the phase-lag compensation unit 310, to the output of the phase-lag compensation unit 310 become the following equations, respectively.

$$Gl(s)=Kl3 \cdot \omega l/(s+\omega l) \tag{28}$$

$$Gp(s)=Kp3 \cdot s/(s+\omega l) \tag{29}$$

$$Lg3(s) = Gl(s) + Gp(s) \tag{30}$$
$$= (Kp3 \cdot s + Kl3 \cdot \omega l)/(s+\omega l)$$

The transfer function $C(s)$ of the compensation calculation unit 9, is normally set so that the low-pass gain becomes large as explained in the first embodiment. Therefore, in the transfer function $Lg3(s)$ of the phase-lag compensation unit 310 shown in Equation (30) described above, Kl3 is set larger than Kp3 so that the low-pass gain becomes larger than the high-pass gain. That is, the phase-lag compensation unit 310 performs the calculation having the frequency response characteristics for multiplying the phase-lag compensation by a constant.

Next, as in the first embodiment, the compensation calculation unit 9 inputs the steering torque $\tau s$ in the high-frequency compensation unit 105, and the high-frequency compensation unit 105 outputs the high-frequency compensation torque $\tau h$ by performing the calculation that applies amplification by means of the differential gain Kd1 and differentiation or pseudo differentiation expressed by the transfer function Gh(s) of Equation (4) as in the first embodiment.

Next, inside the compensation calculation unit 9, the adder 116 adds the output of the phase-lag compensation unit 310 and the high-frequency compensation torque $\tau h$, which is the output of the high-frequency compensation unit 105, and input to the noise filter 107.

As in the first embodiment, the noise filter 107 outputs the current command Ir by performing the low pass filter calculation, expressed by Fn(s) of Equation (5), which may cutoff the higher frequency components than the predetermined noise cutoff frequency $\omega n$ [rad/s] for the input thereof.

As a result of the calculations described above, the compensation calculation unit 9 performs a calculation expressed by the following transfer function C(s) as the whole thereof.

$$C(s)=Fn(s) \cdot \{Lg3(s)+Gh(s)\} \tag{31}$$

In addition, Equation (31) is converted in the following Equations (32) to (35).

$$C(s)=\{b2 \cdot s^{\wedge}2+b1 \cdot s+g0 \cdot \omega l\}/\{(s+\omega l) \cdot (s/\omega n+1)\} \tag{32}$$

$$g0=Kl3 \tag{33}$$

$$b1=Kp3+Kd1 \cdot \omega l \tag{34}$$

$$b2=Kd1 \tag{35}$$

Equation (32) described above is exactly the same as Equation (7) which expresses the transfer function C(s) of the compensation calculation unit 9 in the first embodiment, and it is understood that the coefficients expressed by Equations (8) to (10) are substituted with Equations (33) to (35). In addition, it is understood that the coefficient b1 set by Equation (34) and the coefficient b2 set by Equation (35) are set by the proportional compensation unit 104, the high-frequency compensation unit 105, and the noise filter 107 with exactly the same manner as in the first embodiment and in the third embodiment. On the other hand, it is understood that g0 that sets the steady gain of C(s), which was set by the sum of the proportional gain Kp1 of the proportional compensation unit 104 and the linearized gain Kl1 of the low-frequency amplification unit 103 in the first embodiment, is set by only a linearized gain Kl3 of the low-frequency amplification unit 303 in the third embodiment. Therefore, in the third embodiment, if the assist curve of the low-frequency amplification unit 303 is set so that the linearized gain Kl3 thereof agrees with the sum of the proportional gain Kp3 and the linearized gain Kl1 of the assist curve in the first embodiment, it is understood that the third embodiment operates exactly the same as the first embodiment.

Since the phase-lag compensation unit 310, performs the calculation described above, the output of the low pass filter 302 is the signal, for the steering torque $\tau s$, that is multiplied by a value of gain of which the proportional gain Kp3 is subtracted from the linearized gain Kl3, to which the low pass filter of the low pass filter 302 is further applied. Therefore, inside the frequency combining filter 311, the signal, for the steering torque $\tau s$, that is amplified by the gain (Kl3-Kp3) and the low pass filter is applied, and the signal, for the steering torque $\tau s$, that is amplified by the proportional gain Kp3, are added.

In addition, as is easily understood from Equations (28) to (30), the operation of the phase-lag compensation unit 310 is equivalent to output by adding the signal that the low pass filter is applied to the output of the low-frequency amplification unit 303 and the signal that the high pass filter is applied to the output of the proportional compensation unit 304. That is, the frequency combining filter 311 outputs the signal that the low frequency component of the output of the low-frequency amplification unit 303 and the high frequency component of the output of the proportional compensation unit 304 are added. In addition, if the frequency combining filter 311 is configured to apply the low pass filter and the high pass filter to the output of the low-frequency amplification unit 303 and the output of the proportional compensation unit 304, respectively, the same effect can be obtained.

Moreover, in the operation of the phase-lag compensation unit 310 in the third embodiment, because after the calculation by the low-frequency amplification unit 303 that performs the nonlinear amplification calculation, the low pass filter calculation of the low pass filter 302 in the frequency combining filter 311 is applied, as explained in the first embodiment, even if the assist curve of the low-frequency amplification unit 303 has nonlinear characteristics close to a dead band, when the steering torque τs is suddenly changed, the response is not delayed due to the effect of the nonlinear characteristics.

As described above, according to the third embodiment, because this apparatus includes the phase-lag compensation unit which realizes the characteristics for multiplying the phase-lag compensation by a constant by adding a signal that has applied the amplification by means of the gain determined by the assist curve and applied the low pass filter for the steering torque signal, and a signal that has applied the amplification by means of at least the proportional gain for the steering torque signal, and make it possible to calculate the current command based on the output of the phase-lag compensation unit, this apparatus can calculate the current command with a simple calculation as well as set the low frequency characteristics independently. In other words, it is possible to obtain the steering control apparatus that the calculation amount is small and the design is systematic and simple. Furthermore, because this apparatus includes the high-frequency compensation unit which applies the amplification and differentiation or the pseudo differentiation for the signal based on the steering torque by means of the differential gain to calculate the current command based on the value of which the output of the high-frequency compensation unit is added to the output of the phase-lag compensation unit, the high frequency characteristics can also be set independently from the low frequency characteristics, thereby enabling to realize desired characteristics of the electric power-steering control apparatus that meets the requirements of the road feel and the stability thereof.

Figure 9:
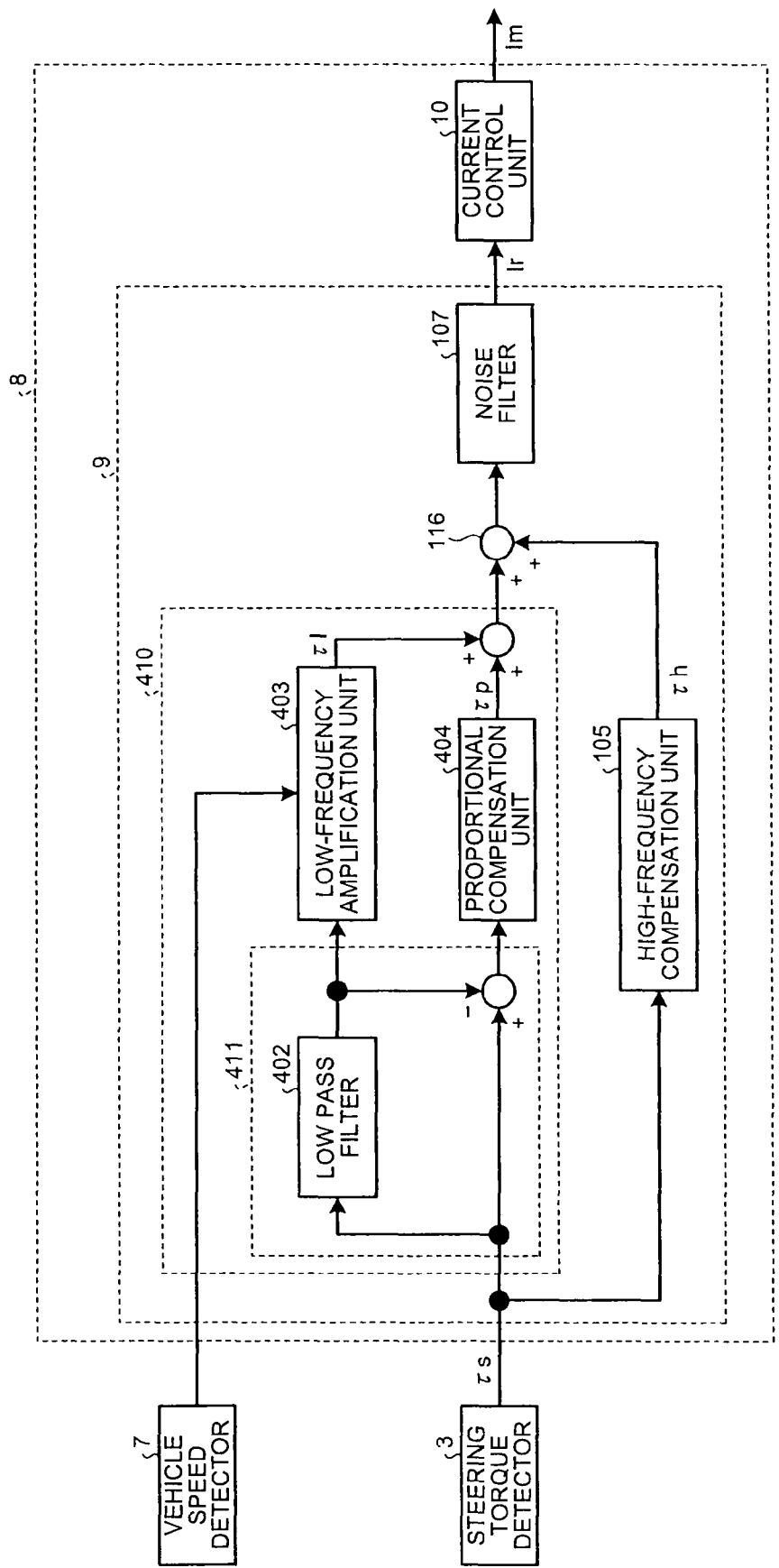
FIG. 9 is a block diagram of a control unit in an electric power-steering control apparatus according to a fourth embodiment of the present invention.

Next, an electric power-steering control apparatus according to a fourth embodiment of the present invention will be explained. The whole configuration is the same as shown in FIG. 1 and the explanation thereof is abbreviated. FIG. 9 is a block diagram of a control unit 8 according to the fourth embodiment with the same letter or numeral put for the same unit as the first embodiment. The fourth embodiment replaces the phase-lag compensation unit 110 in the first embodiment or the phase-lag compensation unit 310 in the third embodiment with a phase-lag compensation unit 410 that performs an equivalent calculation with a different configuration.

The control unit 8 includes the compensation calculation unit 9 and the current control unit 10, and inputs the steering torque τs detected by the steering torque detector 3 and the vehicle speed detected by the vehicle speed detector 7 in the compensation calculation unit 9. The compensation calculation unit 9 outputs the current command Ir as a result of having performed the calculation described below. The current control unit 10 controls so that the current Im of the motor 4 agrees with the current command Ir calculated in the compensation calculation unit 9.

Next, a calculation operation of the compensation calculation unit 9 is explained. The compensation calculation unit 9 inputs the steering torque τs in a phase-lag compensation unit 410. The phase-lag compensation unit 410 inside the unit thereof inputs the steering torque τs in a frequency separation filter 411. The frequency separation filter 411 inside the filter thereof inputs the steering torque τs in a low pass filter 402. The low pass filter 402 performs the low pass filter calculation as in the low pass filter 102 in the first embodiment, and outputs the result as a low-frequency steering torque signal. The frequency separation filter 411 outputs the low-frequency steering torque signal and the high-frequency steering torque signal that the low-frequency steering torque signal is subtracted from the steering torque τs. That is, the frequency separation filter 411 is a filter that separates the steering torque τs into the low frequency component and the high frequency component, as in the blending filter described in Japanese Patent Application Laid-open No. H7-309250.

Next, the phase-lag compensation unit 410 inside the unit thereof inputs the low-frequency steering torque signal in a low-frequency amplification unit 403. The low-frequency amplification unit 403 outputs, as in the low-frequency amplification unit 103 in the first embodiment, the low-frequency compensation torque τl by performing a calculation for amplifying the signal by a gain determined by the assist curve which is nonlinear and varies according to the vehicle speed. The linearized gain of the nonlinear gain in the low-frequency amplification unit 403 is described as Kl4. A transfer function Gl(s) from the steering torque τs to the low-frequency compensation torque τl has characteristics for applying the amplification by the gain Kl4 and the low pass filter.

$$Gl(s)=Kl4 \cdot \omega l/(s+\omega l) \tag{36}$$

Next, the phase-lag compensation unit 410 inside the unit thereof inputs the high-frequency steering torque signal in a proportional compensation unit 404. The proportional compensation unit 404 performs a calculation for multiplying a proportional gain Kp4, which is a predetermined value, for the input, and outputs the result as the proportional compensation torque τp. The transfer function Gp(s) from the steering torque τs to the proportional compensation torque τp becomes the following equation. That is, the equation has characteristics for applying the high pass filter and the amplification by the proportional gain Kp4.

$$Gp(s)=Kp4 \cdot s/(s+\omega l) \tag{37}$$

The transfer function Gp(s) from the steering torque τs to the proportional compensation torque τp, has the characteristics for multiplying the high pass filter and the gain, and characteristics are different from Equation (2) in the first embodiment.

Next, the phase-lag compensation unit 410 outputs the sum of the low-frequency compensation torque τl and the proportional compensation torque τp. From Equations (36) and (37) described above, a transfer function Lg4(s) of the phase-lag compensation unit 410 for the steering torque τs as the input becomes the following equation.

$$Lg4(s)=(Kp4 \cdot s+Kl4 \cdot \omega l)/(s+\omega l) \tag{38}$$

As described in the first embodiment, the transfer function C(s) of the compensation calculation unit 9 is normally set so that the low-pass gain becomes large. Therefore, in the transfer function Lg4(s) of the phase-lag compensation unit 410 shown in Equation (38) described above, Kl4 is set larger than Kp4 so that the low-pass gain becomes larger than the high-pass gain. That is, the phase-lag compensation unit 410 performs the calculation having the characteristics for multiplying the phase-lag compensation by a constant.

Next, the compensation calculation unit 9 inputs the steering torque τs in the high-frequency compensation unit 105 as in the first embodiment. The high-frequency compensation unit 105 performs, as in the first embodiment, the calculation for applying the amplification by the differential gain Kd1 and the differentiation or the pseudo differentiation expressed by the transfer function Gh(s) of Equation (4) to output the high-frequency compensation torque τh.

Next, inside the compensation calculation unit 9, the adder 116 adds the output of the phase-lag compensation unit 410 and the high-frequency compensation torque τh, which is the output of the high-frequency compensation unit 105, to output in the noise filter.

The noise filter 107 performs, as in the first embodiment, the low pass filter calculation expressed by Fn(s) in Equation (5) so as to cutoff the higher frequency component than a predetermined noise cutoff frequency ωn [rad/s] and outputs the current command Ir.

As a result of the calculations described above, the compensation calculation unit 9 performs a calculation expressed by the following transfer function C(s) as the whole thereof.

$$C(s) = Fn(s) \cdot \{Lg4(s) + Gh(s)\} \quad (39)$$

In addition, Equation (39) can be converted into the following Equations (40) to (43).

$$C(s) = \{b2 \cdot s^2 + b1 \cdot s + g0 \cdot \omega l\} / \{(s + \omega l) \cdot (s/\omega n + 1)\} \quad (40)$$

$$g0 = Kl4 \quad (41)$$

$$b1 = Kp4 + Kd1 \cdot \omega l \quad (42)$$

$$b2 = Kd1 \quad (43)$$

Equation (40) described above is exactly the same as Equations (7) and (32) that express the transfer function C(s) of the compensation calculation unit 9 in the first embodiment and the third embodiment, respectively. In addition, it is understood that the coefficients expressed by Equations (41) to (43) are also exactly the same as the coefficients that in Equations (33) to (35) in the third embodiment, the linearized gain Kl3 of the low-frequency amplification unit 303 and the proportional gain Kp3 in the proportional compensation unit 304 are replaced with the linearized gain Kl4 of the low-frequency amplification unit 403 and the proportional gain Kp4 in the proportional compensation unit 404 in the fourth embodiment, respectively. Therefore, it is understood that the fourth embodiment performs the same operation as the third embodiment.

In addition, in the operation of the phase-lag compensation unit 410 in the fourth embodiment, after the low pass filter calculation of the low pass filter 402 in the frequency separation filter 411, the nonlinear amplification calculation by means of the low-frequency amplification unit 403 is applied; so, as explained in the first embodiment, if the assist curve of the low-frequency amplification unit 403 has nonlinear characteristics close to a dead band, when the steering torque τs is suddenly changed, the response is delayed due to the effect of the nonlinear characteristics; the fourth embodiment has such a weakness compared with the third embodiment.

As described above, according to the present forth embodiment, the characteristics in the low and high frequency ranges can be independently set, respectively, thereby enabling to realize desirable characteristics of the electric power-steering control apparatus that meets the requirements of the road feel and the stability with a very systematic and simple design as well as a very small amount of calculation.

Figure 10:
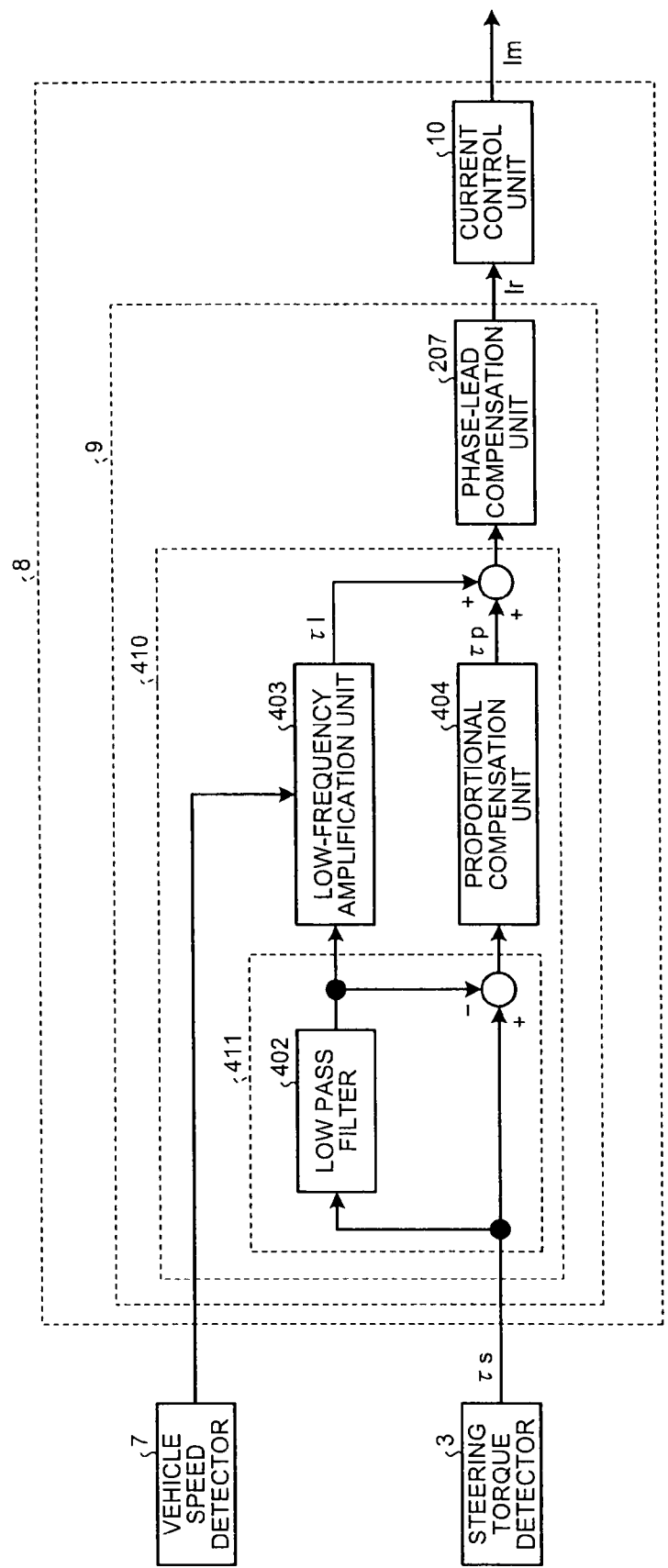
FIG. 10 is a block diagram of a control unit in an electric power-steering control apparatus according to a fifth embodiment of the present invention.

Next, an electric power-steering control apparatus according to a fifth embodiment of the present invention will be explained. The whole configuration is the same as shown in FIG. 1 and the explanation thereof is abbreviated. FIG. 10 is a block diagram of a control unit 8 according to the fifth embodiment with the same letter or numeral put for the same unit as the second and fourth embodiments. The fifth embodiment replaces the phase-lag compensation unit 110 in the second embodiment with the phase-lag compensation unit 410 in the fourth embodiment.

The control unit 8 includes the compensation calculation unit 9 and the current control unit 10, and inputs the steering torque τs detected by the steering torque detector 3 and the vehicle speed detected by the vehicle speed detector 7 in the compensation calculation unit 9. The compensation calculation unit 9 outputs the current command Ir as a result of having performed the calculation described below. The current control unit 10 controls so that the current Im of the motor 4 agrees with the current command Ir calculated in the compensation calculation unit 9.

Next, the calculation operation of the compensation calculation unit 9 is explained. The compensation calculation unit 9 inputs the steering torque τs in the phase-lag compensation unit 410. The phase-lag compensation unit 410 performs exactly the same calculation as the phase-lag compensation unit 410 in the fourth embodiment. That is, by setting Kl4 larger than Kp4 in the transfer function Lg4(s) expressed by Equation (38), a calculation having characteristics for multiplying the phase-lag compensation by a constant is performed.

Next, the compensation calculation unit 9 inputs the output of the phase-lag compensation unit 410 in the phase-lead compensation unit 207, and just as in the second embodiment, the phase-lead compensation unit 207 performs the calculation of the phase-lead compensation filter expressed by Fld(s) of Equation (22) and outputs the current command Ir.

As the result described above, the compensation calculation unit 9 performs a calculation expressed by the transfer function C(s) of the following equation as a whole.

$$C(s) = Fld(s)Lg4(s) \quad (44)$$

In addition, Equation (44) can be converted into Equations (44) and (49).

$$C(s) = \{b2 \cdot s^2 + b1 \cdot s + g0 \cdot \omega l\} / \{(s + \omega l) \cdot (s/\omega n + 1)\} \quad (45)$$

$$g0 = Kl4 \quad (46)$$

$$b1 = Kp4 + Kl4 \cdot \omega l / \omega ld \quad (47)$$

$$b2 = Kp4 / \omega ld \quad (48)$$

Equation (45) described above is exactly the same as Equation (7) that expresses the transfer function C(s) of the compensation calculation unit 9 in the first embodiment and Equation (23) that expresses the transfer function C(s) of the compensation calculation unit 9 in the second embodiment. Furthermore, Equations (46) to (48), which express the coefficients, are substantially the same as Equations (25) to (27) by replacing the sum of Kl1 and Kp1 with Kl4 and Kp1 with Kp4 in Equations (25) to (27) in the second embodiment.

Therefore, in the fifth embodiment, if the assist curve of the low-frequency amplification unit 403 is set so that the linearized gain Kl4 agrees with the sum of the proportional gain Kp4 and the linearized gain Kl1 of the assist curve in the second embodiment, it is understood that the fifth embodiment operates exactly the same as the second embodiment.

In addition, techniques described in the fifth embodiment and Japanese Patent Application Laid-open No. H7-309247 are compared with each other. The technique described in Japanese Patent Application Laid-open No. H7-309247 has a configuration that the phase-lead compensation unit 207 in the fifth embodiment is replaced with the phase lag-lead filter, which is the product of the phase-lag compensation filter and the phase-lead compensation filter. Therefore, the amount of calculation is increased compared with the fifth embodiment. In addition, the technique described in Japanese Patent Application Laid-open No. H7-309247 is configured that after the steady gain, that is, the gain in the low frequency range is set so that it becomes as relatively large as possible using the lag-lead filter described above, the steady gain is reduced using the nonlinear gain by means of the blending filter that corresponds to the phase-lag compensation unit 410 in the fifth embodiment. That is, the technique described in Japanese Patent Application Laid-open No. H7-309247 performs the calculation of not the phase-lag compensation but the phase-lead compensation characteristics by means of the blending filter that corresponds to the phase-lag compensation unit 410 in the fifth embodiment. From these result, the fifth embodiment sets the steady gain g0 and the pole ω1 that determine the characteristics in the low frequency range using only the portion of the phase-lag compensation unit 410; on the other hand, in the technique described in Japanese Patent Application Laid-open No. H7-309247, in order to determine the characteristics in the low frequency range, the steady gain of the blending filter, the pole of the lag-lead compensation filter, and the pole or the zero point of the blending filter must be designed by mutually associating with each other. That is, it is understood that the fifth embodiment has smaller amount of calculation, and the operation and design of each part of the compensation calculation unit is more systematic and simpler.

In addition, as stated above, the reason why the fifth embodiment can realize the invention more systematically and simply than the technique described in Japanese Patent Application Laid-open No. H7-309247 is that in the phase-lag compensation unit 410 in the fifth embodiment, with the calculation of adding the signal that the low pass filter of the low pass filter 402 and the amplification by the linearized gain Kl4 in the low-frequency amplification unit 403 are applied for the steering torque τs, and the signal that at least the proportional gain Kp4 of the proportional compensation unit 404 is applied for the steering torque τs by means of the action of the low pass filter 402, the low-frequency amplification unit 403, and the proportional compensation unit 404, the phase-lag compensation unit 410 is configured so as to have characteristics for multiplying the phase-lag compensation by a constant. For this reason, for the output of the phase-lag compensation, not the lag-lead compensation, but only the phase-lead compensation by means of the phase-lead compensation unit 207 can be applied.

Moreover, because the fifth embodiment uses the same phase-lag compensation unit 410 as the fourth embodiment, it has a weakness, compared with the third embodiment, that when the steering torque τs is suddenly changed, the response is delayed due to the effect of the nonlinear characteristics, as in the fourth embodiment.

As described above, according to the fifth embodiment, although there is a restriction in the realizable range of the characteristics of the transfer function C(s) of the compensation calculation unit 9 compared with the first embodiment, and also there are some restriction in the performance, in addition, the settings of the characteristics in the high frequency range become more complex compared with the first embodiment, the characteristics in the low frequency range can be independently set from those in the high frequency range, thereby enabling to realize desirable characteristics of the electric power-steering control apparatus that meets the requirements of the road feel and the stability with a very systematic and simple design as well as a very small amount of calculation.

Figure 11:
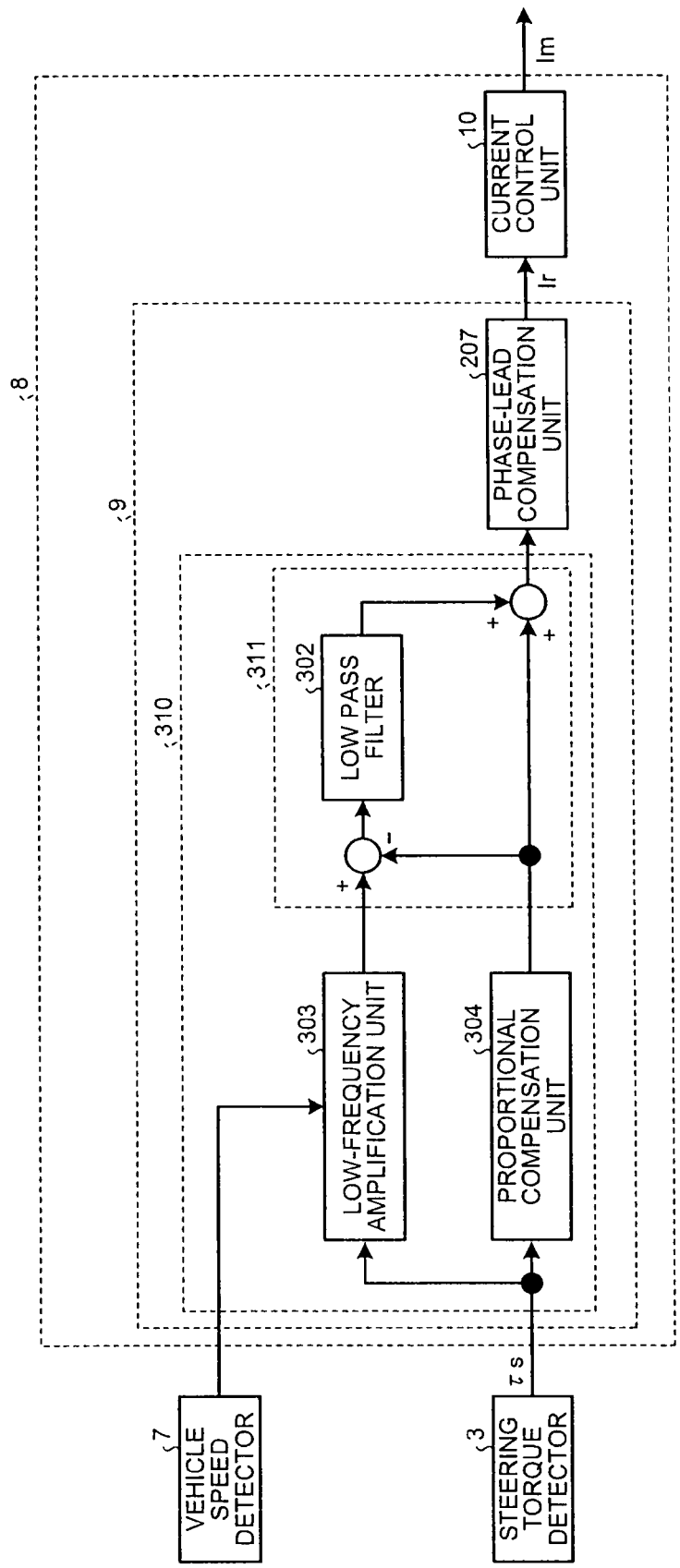
FIG. 11 is a block diagram of a control unit in an electric power-steering control apparatus according to a sixth embodiment of the present invention.

Next, an electric power-steering control apparatus according to a sixth embodiment of the present invention will be explained. The whole configuration is the same as shown in FIG. 1 and the explanation thereof is abbreviated. FIG. 11 is a block diagram of the control unit 8 according to the sixth embodiment with the same letter or numeral put for the same unit as the third and fifth embodiments. The sixth embodiment replaces the phase-lag compensation unit 410 in the fifth embodiment with the phase-lag compensation unit 310 in the third embodiment.

The control unit 8 includes the compensation calculation unit 9 and the current control unit 10, and inputs the steering torque τs detected by the steering torque detector 3 and the vehicle speed detected by the vehicle speed detector 7 in the compensation calculation unit 9. The compensation calculation unit 9 outputs the current command Ir as a result of performing the calculation described later. The current control unit 10 controls the current Im of the motor 4 so that the current Im agrees with the current command calculated in the compensation calculation unit 9.

Next, the calculation operation of the compensation calculation unit 9 is explained. The compensation calculation unit 9 inputs the steering torque τs in the phase-lag compensation unit 310. The phase-lag compensation unit 310 performs the same calculation as the phase-lag compensation unit 310 in the third embodiment. That is, by setting Kl3 larger than Kp3 in the transfer function Lg3($s$) expressed by Equation (30), the calculation having the characteristics for multiplying the phase-lag compensation by a constant is performed.

Next, the compensation calculation unit 9 inputs the output of the phase-lag compensation unit 310 in the phase-lead compensation unit 207, and the phase-lead compensation unit 207 performs the calculation having the characteristics of the phase-lead compensation filter as in the fifth embodiment to output the current command Ir.

Since the sixth embodiment operates as described above, when compared with the fifth embodiment, while the phase-lag compensation unit 410 of the fifth embodiment performed the calculations of the low-frequency amplification unit 403 and the proportional compensation unit 404 after the calculation of the frequency separation filter 411, the sixth embodiment has a configuration with only the calculation order made different between the nonlinear calculation and the linear filter calculation by using the frequency combining filter 311 instead of the frequency separation filter 411 in the fifth embodiment, and performing the calculation of the frequency combining filter after the calculations of the low-frequency amplification unit 303 and the proportional compensation unit 304. In the configuration according to the fifth embodiment, because the low-frequency amplification unit 403 acts after the calculation of the low pass filter 402 is performed in the frequency separation filter 411, as explained in the first embodiment, if the assist curve of the low-frequency amplification unit 403 has nonlinear characteristics close to a dead band, such as when the steering torque τs is suddenly changed, the response is delayed due to the effect of the nonlinear characteristics. Although the fifth embodiment has such a weakness described above, the sixth embodiment has a feature that there is no such a delay of response.

According to the sixth embodiment, as in the fifth embodiment, although there is a restriction in the realizable range of the characteristics of the transfer function C(s) of the compensation calculation unit 9 compared with the first embodiment, and also there are some restriction in the performance, in addition, the settings of the characteristics in the high frequency range become more complex compared with the first embodiment, the characteristics in the low frequency range can be independently set from those in the high frequency range, thereby enabling to realize desirable characteristics of the electric power-steering control apparatus that meets the requirements of the road feel and the stability with a very systematic and simple design as well as a very small amount of calculation.

As described above, according to one aspect of the present invention, because the characteristics in the low frequency range are made to be independently set using a simple calculation, an advantageous effect is realized that, a steering control apparatus having a small calculation amount can be obtained with the design thereof being systematic, simple and easy.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electric power-steering control apparatus that assists in steering wheels of a vehicle in response to a steering torque applied by a driver by using a driving force of a motor, the electric power-steering control apparatus comprising:
a steering-torque detecting unit that detects the steering torque as a steering torque signal;
a phase-lag compensation unit that performs an operation having a frequency response characteristic of multiplying a phase-lag compensation by a constant for the steering torque signal based on a first signal obtained by applying an amplification by a first gain and a low pass filter on the steering torque signal and a second signal obtained by applying an amplification by at least a second gain on the steering torque signal; and
a current control unit that controls a current applied to the motor to follow a current command that is obtained based on an output of the phase-lag compensation unit.

2. The electric power-steering control apparatus according to claim 1, wherein the phase-lag compensation unit determines the first gain using at least the steering torque signal.

3. The electric power-steering control apparatus according to claim 1, wherein
the phase-lag compensation unit includes
a low-frequency compensation unit that applies the amplification by the first gain and the low pass filter on the steering torque signal to generate the first signal,
a proportional compensation unit that applies the amplification by the second gain on the steering torque signal to generate the second signal, and
an adder that adds the first signal and the second signal, and
the current command is obtained based on an output of the adder.

4. The electric power-steering control apparatus according to claim 3, wherein the low-frequency compensation unit includes
a low-frequency amplification unit that amplifies the steering torque signal by the first gain, and
a low pass filter that passes a low frequency component of an output of the low-frequency amplification unit.

5. The electric power-steering control apparatus according to claim 1, wherein
the phase-lag compensation unit includes
a low-frequency amplification unit that amplifies the steering torque signal by the first gain,
a proportional compensation unit that amplifies the steering torque signal by the second gain, and
a frequency combining filter that combines a low frequency component of an output of the low-frequency amplification unit and a high frequency component of an output of the proportional compensation unit, and
the current command is obtained based on an output of the frequency combining filter.

6. The electric power-steering control apparatus according to claim 1, wherein
the phase-lag compensation unit includes
a frequency separation filter that separates a low frequency component and a high frequency component of the steering torque signal,
a low-frequency amplification unit that amplifies the low frequency component of the steering torque signal by the first gain,
a proportional compensation unit that amplifies the high frequency component of the steering torque signal by the second gain, and
an adder that adds an output of the low-frequency amplification unit and an output of the proportional compensation unit, and
the current command is obtained based on an output of the adder.

7. The electric power-steering control apparatus according to claim 1, further comprising a high-frequency compensation unit that applies an amplification by a third gain and a differentiation or a pseudo differentiation on the steering torque signal, wherein
the current command is obtained based on a signal obtained by adding an output of the phase-lag compensation unit and an output of the high-frequency compensation unit.

8. The electric power-steering control apparatus according to claim 1, further comprising a phase-lead compensation unit that performs a calculation having a characteristic of a phase-lead compensation filter for an output of the phase-lag compensation unit and outputs a result of the calculation as the current command.

* * * * *